US012165591B2

(12) United States Patent
Gao et al.

(10) Patent No.: US 12,165,591 B2
(45) Date of Patent: Dec. 10, 2024

(54) DRIVING METHOD OF A DISPLAY PANEL AND DISPLAY DEVICE

(71) Applicant: Xiamen Tianma Display Technology Co., Ltd., Xiamen (CN)

(72) Inventors: Yana Gao, Xiamen (CN); Gaojun Huang, Xiamen (CN)

(73) Assignee: Xiamen Tianma Display Technology Co., Ltd., Xiamen (CN)

( * ) Notice: Subject to any disclaimer, the term of this patent is extended or adjusted under 35 U.S.C. 154(b) by 0 days.

(21) Appl. No.: 18/519,215

(22) Filed: Nov. 27, 2023

(65) Prior Publication Data

US 2024/0087532 A1 Mar. 14, 2024

(30) Foreign Application Priority Data

Aug. 8, 2023 (CN) ......................... 202310990777.6

(51) Int. Cl.
*G09G 5/00* (2006.01)
*G09G 3/3233* (2016.01)

(52) U.S. Cl.
CPC ... *G09G 3/3233* (2013.01); *G09G 2300/0819* (2013.01); *G09G 2300/0842* (2013.01); *G09G 2300/0861* (2013.01); *G09G 2310/061* (2013.01); *G09G 2310/08* (2013.01); *G09G 2320/0233* (2013.01); *G09G 2320/0247* (2013.01); *G09G 2330/021* (2013.01)

(58) Field of Classification Search
CPC ...... G09G 3/32; G09G 3/3208; G09G 3/3233; G09G 3/38; G09G 2300/0819; G09G 2300/0842; G09G 2310/061; G09G 2310/08; G09G 2310/0264; G09G 2320/0233; G09G 2320/0247; G09G 2330/021; G09G 2340/0435
See application file for complete search history.

(56) References Cited

U.S. PATENT DOCUMENTS

| | | | | |
|---|---|---|---|---|
| 11,881,158 | B2 * | 1/2024 | Ding | G09G 3/32 |
| 12,002,425 | B2 * | 6/2024 | Huangfu | G09G 3/3233 |
| 2014/0062331 | A1 * | 3/2014 | Nam | G09G 3/3233 315/226 |
| 2017/0249898 | A1 * | 8/2017 | Ma | G09G 3/3233 |
| 2021/0027697 | A1 * | 1/2021 | Yoon | G09G 3/20 |
| 2023/0067920 | A1 * | 3/2023 | Kim | G09G 3/3291 |
| 2023/0116559 | A1 * | 4/2023 | Park | G09G 3/32 345/204 |
| 2023/0215360 | A1 * | 7/2023 | Kim | G09G 3/3275 |
| 2023/0335045 | A1 * | 10/2023 | Hu | G09G 3/32 |

* cited by examiner

*Primary Examiner* — Joe H Cheng
(74) *Attorney, Agent, or Firm* — KDW Firm PLLC

(57) ABSTRACT

A display panel includes a fundamental frequency display frame and a low frequency display frame. In the fundamental frequency display frame, a light emission control signal includes a light emission control period. A bias adjustment signal includes a bias adjustment period. The bias adjustment period is M times greater than the light emission control period. The fundamental frequency display frame includes a fundamental frequency scan stage. The time of the fundamental frequency scan stage is N times greater than the light emission control period. The low frequency display frame includes a fundamental frequency scan stage and a blank stage. The blank stage includes at least a non-bias stage. The time of the non-bias stage is L times greater than the light emission control period. L is not an integer multiple of M.

20 Claims, 14 Drawing Sheets

DRIVING METHOD OF A DISPLAY PANEL AND DISPLAY DEVICE

CROSS-REFERENCE TO RELATED APPLICATION(S)

This application claims priority to Chinese Patent Application No. 202310990777.6 filed with the China National Intellectual Property Administration (CNIPA) on Aug. 8, 2023, the disclosure of which is incorporated herein by reference in its entirety.

TECHNICAL FIELD

The present disclosure relates to the field of display technology, for example, a driving method of a display panel and a display device.

BACKGROUND

With the widespread use of electronic devices (such as mobile phones and tablet computers), the electronic devices can support more and more applications, and the functions become more and more powerful. The electronic devices are developed in a diversified and personalized direction and become indispensable electronic supplies in the life of users.

In the current display devices, panels or devices including electroluminescent devices such as organic light-emitting diodes and mini diodes can generally be driven according to different drive frequencies. That is, a display panel may display an image according to different refresh frequencies. When high-speed driving is required, a pixel is driven by increasing a refresh frequency. When power consumption must be reduced, or low-speed driving is required, a pixel is driven by reducing a refresh frequency.

In the related art, when a screen is applied to a frequency-convertible scenario, the working frequency range of the screen may be changed. However, based on the consideration of a display effect, frequency switching is often limited, that is, selectable frequencies are limited.

SUMMARY

The present disclosure provides a driving method of a display panel and a display device.

The present disclosure provides a driving method of a display panel. The display panel to which the driving method is applied includes a fundamental frequency display frame and a low frequency display frame. The display panel also includes a light emission control signal and a bias adjustment signal. In the fundamental frequency display frame, the light emission control signal includes a light emission control period. The bias adjustment signal includes a bias adjustment period. The bias adjustment period is M times greater than the light emission control period. M is a positive integer. The fundamental frequency display frame includes a fundamental frequency scan stage. The time of the fundamental frequency scan stage is N times greater than the light emission control period. N is a positive integer greater than or equal to 2. The low frequency display frame includes a fundamental frequency scan stage and a blank stage. The blank stage includes at least a non-bias stage. The time of the non-bias stage is L times greater than the light emission control period. L is not an integer multiple of M.

The present disclosure also provides a display device. A display panel included in the display device is driven by the preceding driving method.

BRIEF DESCRIPTION OF DRAWINGS

The drawings, which are incorporated in and constitute a part of the description, illustrate embodiments of the present disclosure.

DETAILED DESCRIPTION

Figure 1:
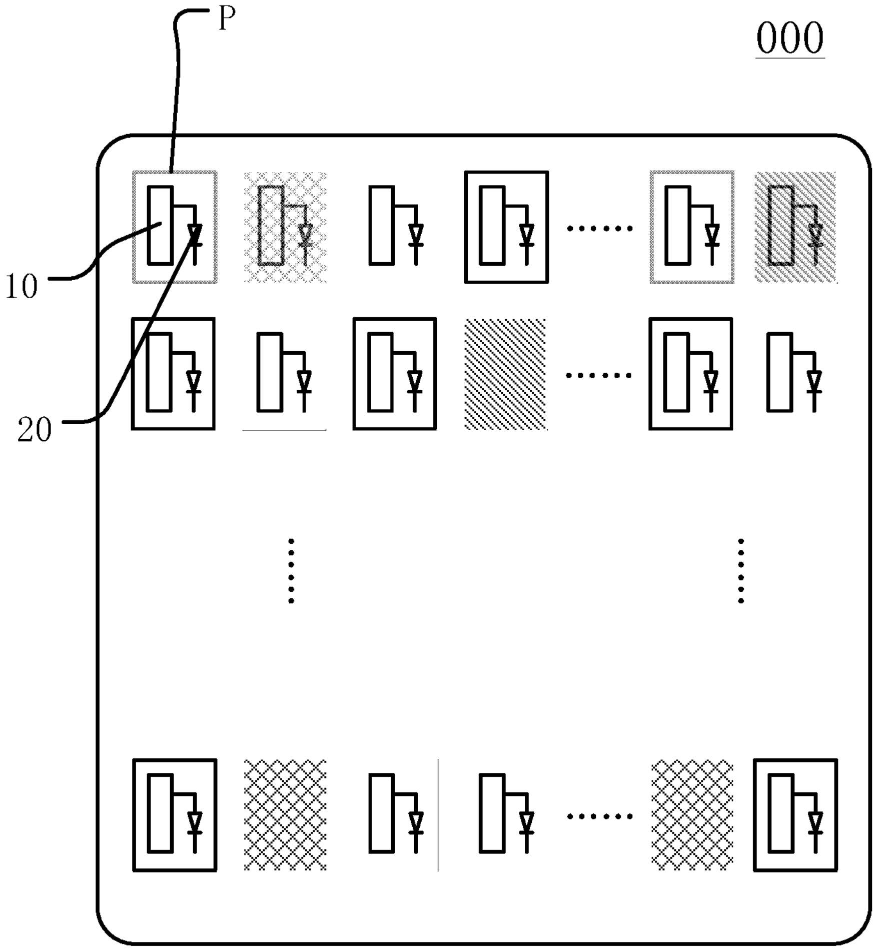
FIG. 1 is a diagram illustrating the planar structure of a display panel according to an embodiment of the present disclosure.

Various example embodiments of the present disclosure are described in detail with reference to the drawings. It should be noted that relative arrangements of components and steps, numerical expressions and numerical values set forth in these embodiments do not limit the scope of the present disclosure unless otherwise specified.

The following description of at least one example embodiment is merely illustrative in nature and is in no way intended to limit the present disclosure and the present application or usages thereof.

Techniques, methods, and devices known to those of ordinary skill in the related art may not be discussed, but where appropriate, such techniques, methods, and devices should be considered part of the specification.

In all examples shown and discussed herein, any values should be construed as merely exemplary and not as limiting. Therefore, other examples of the example embodiments may have different values.

It is apparent for those skilled in the art that various modifications and changes in the present disclosure may be made without departing from the spirit or scope of the present disclosure. Accordingly, the present disclosure is intended to cover modifications and variations of the present disclosure that fall within the scope of the corresponding claims (the claimed technical solutions) and their equivalents. It is to be noted that embodiments of the present disclosure, if not in collision, may be combined with each other.

It should be noted that similar reference numerals and letters indicate similar items in the drawings below, and therefore, once a particular item is defined in a drawing, the item need not to be further discussed in following drawings.

Figure 2:
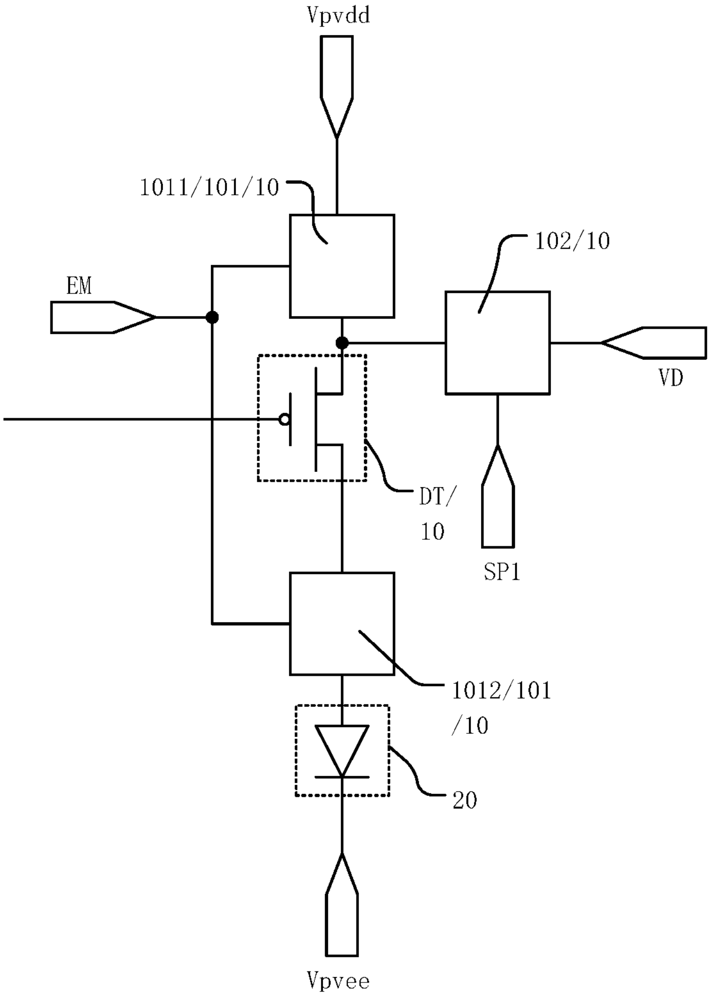
FIG. 2 is a diagram illustrating the electrical connection structure of a sub-pixel of FIG. 1.
Figure 3:
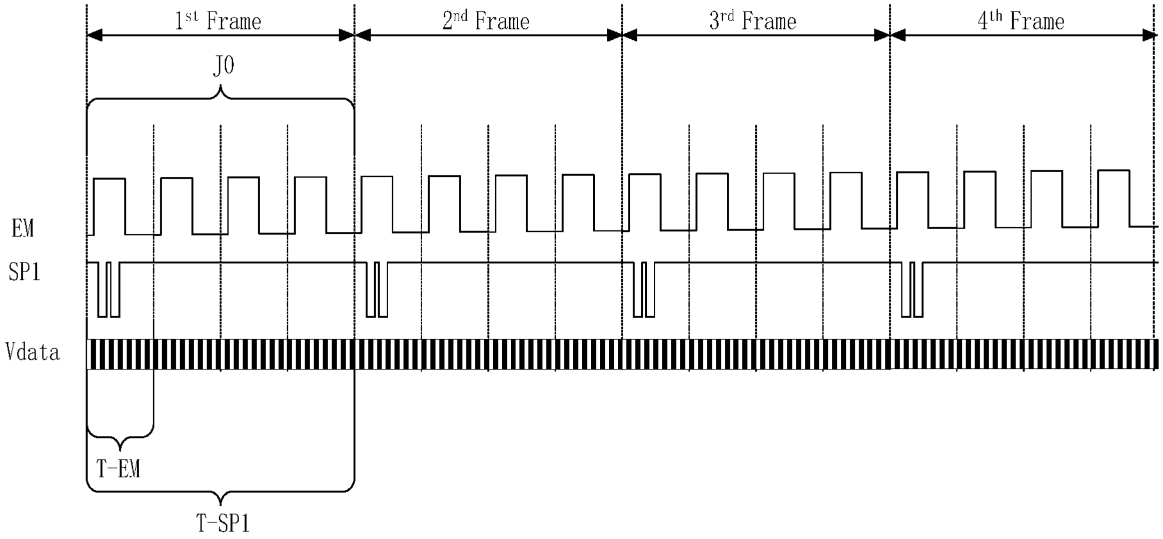
FIG. 3 is a diagram of the drive period of a display panel in multiple fundamental frequency display frames in a driving method according to an embodiment of the present disclosure.
Figure 4:
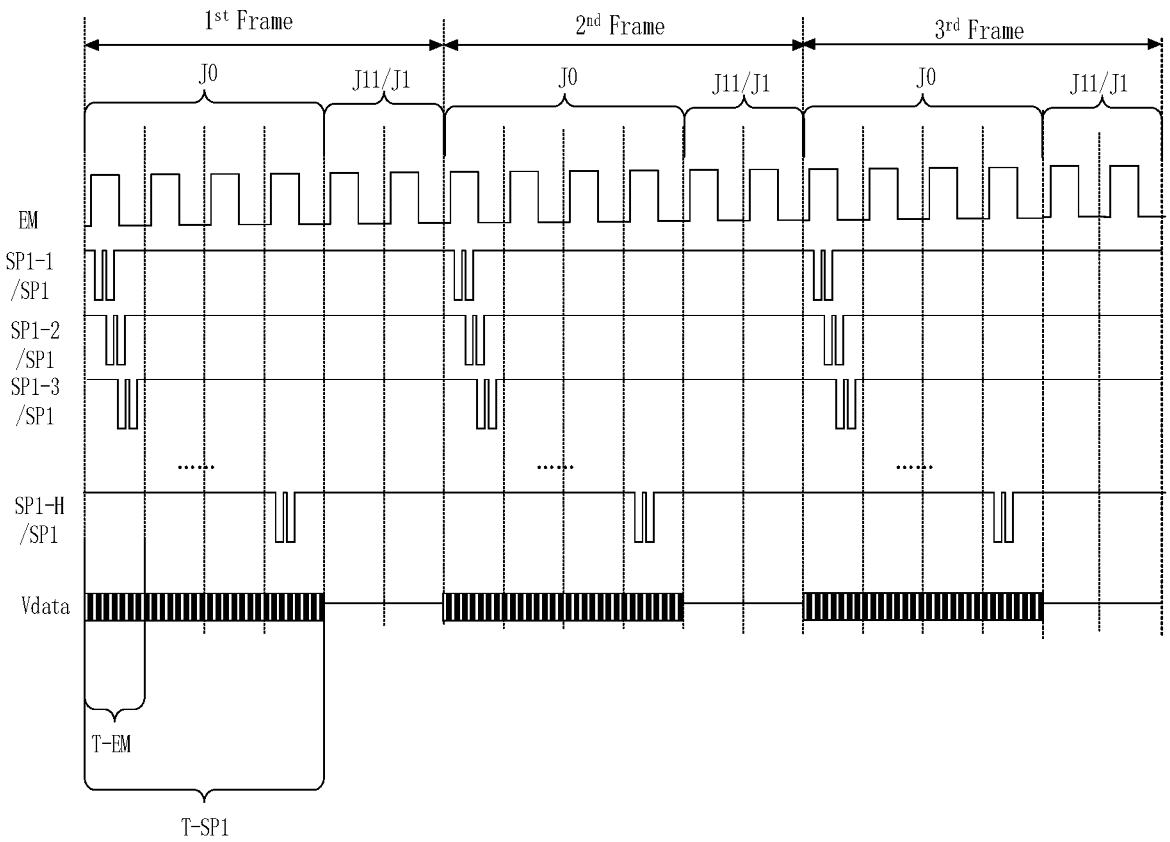
FIG. 4 is a diagram of the drive period of the display panel in multiple low frequency display frames in the driving method according to an embodiment of the present disclosure.

Referring to FIGS. 1 to 4, FIG. 1 is a diagram illustrating the planar structure of a display panel according to an embodiment of the present disclosure; FIG. 2 is a diagram illustrating the electrical connection structure of a sub-pixel of FIG. 1; FIG. 3 is a diagram of the drive period of a display panel in multiple fundamental frequency display frames in a driving method according to an embodiment of the present disclosure; and FIG. 4 is a diagram of the drive period of the display panel in multiple low frequency display frames in the driving method according to an embodiment of the present disclosure. This embodiment provides a driving method of a display panel. The display panel 000 to which the driving method is applied includes a fundamental frequency display frame and a low frequency display frame.

The display panel 000 also includes a light emission control signal EM and a bias adjustment signal SP1. In the fundamental frequency display frame, the light emission control signal EM includes a light emission control period T-EM, and the bias adjustment signal SP1 includes a bias adjustment period T-SP1. The bias adjustment period T-SP1 is M times greater than the light emission control period T-EM. M is a positive integer.

The fundamental frequency display frame includes a fundamental frequency scan stage J0. The time of the fundamental frequency scan stage J0 is N times greater than the light emission control period T-EM. N is a positive integer greater than or equal to 2.

The low frequency display frame includes a fundamental frequency scan stage J0 and a blank stage J1. The blank stage J1 includes at least a non-bias stage J11. The time of the non-bias stage J11 is L times greater than the light emission control period T-EM. L is not an integer multiple of M.

The driving method provided by this embodiment may be applied to a display panel including an electroluminescent device such as an organic light-emitting diode display panel or a micro light-emitting diode display panel. For example, when the display panel 000 is an organic light-emitting diode display panel, the display panel 000 may include multiple sub-pixels P. For example, the multiple sub-pixels P may include multiple different colors (illustrated and distinguished by different filling patterns in FIG. 1). For example, the multiple sub-pixels P may include at least red sub-pixels, green sub-pixels, and blue sub-pixels, and may also include white sub-pixels. This is not limited in this embodiment. For example, the multiple sub-pixels P may be arranged in an array on the display panel 000 or may be arranged in other manners. In this embodiment, description is given with reference to FIG. 1 by using an example in which the multiple sub-pixels P are arranged in an array. It is to be understood that in this embodiment, an example is given with reference to FIG. 1 by using an example in which the orthographic projection of a sub-pixel P onto the light emission surface of the display panel 000 is strip-shaped. The shape of the sub-pixel P includes but is not limited to this shape. For example, the shape of the sub-pixel P may also be designed as a circle or a polygon, which may be designed according to actual requirements. As shown in FIG. 2, the sub-pixel P of the display panel 000 includes a pixel circuit 10 and a light-emitting element 20 electrically connected to the pixel circuit 10. The light-emitting element 20 may be an organic light-emitting diode. The pixel circuit 10 included in the sub-pixel P is configured to transmit a light-emitting drive current to the light-emitting element 20 under the action of the signal of a drive signal line (such as a scan line, a data line, a power signal line, a light emission control signal line, and a reset signal line, not shown in the figure) on the display panel 000 so that the drive current is provided to the light-emitting element 20 to enable the light-emitting element 20 to emit light. It is to be understood that the light-emitting principle of the sub-pixel P in the display panel 000 is not described in detail in this embodiment. For details, reference may be made to the display principle of an organic light-emitting display panel in the related art for understanding.

As shown in FIG. 2, the pixel circuit 10 of each sub-pixel P of the display panel 000 to which the driving method of this embodiment is applied includes at least a drive transistor DT, a light emission control module 101, and a bias adjustment module 102. The light emission control module 101 may include a first light emission control module 1011 and a second light emission control module 1012. A first terminal of the first light emission control module 1011 is electrically connected to a first pole of the drive transistor DT. A second terminal of the first light emission control module 1011 is electrically connected to a first power signal Vpvdd. A first terminal of the second light emission control module 1012 is electrically connected to a second pole of the drive transistor DT. The second light emission control module 1012 is electrically connected to the anode of the light-emitting element 20. The cathode of the light-emitting element 20 is electrically connected to a second power signal Vpvee. A first terminal of the bias adjustment module 102 is electrically connected to the first pole of the drive transistor DT. A second terminal of the bias adjustment module 102 is electrically connected to a bias voltage signal VD.

In this embodiment, the display panel 000 also includes a light emission control signal EM and a bias adjustment signal SP1. A control terminal of the light emission control module 101 (a control terminal of the first light emission control module 1011 and a control terminal of the second light emission control module 1012 may be connected and both used as the control terminal of the light emission control module 101) is electrically connected to the light emission control signal EM. Under the control of the light emission control signal EM, whether or not a first terminal and a second terminal of the light emission control module 101 are conductive is implemented. The first light emission control module 1011 and the second light emission control module 1012 may be turned on at the same time. During the driving process of the display panel 000, in the light emission stage of the pixel circuit 10, the light emission control signal EM controls the first terminal and the second terminal of the first light emission control module 1011 to be conductive and controls the first terminal and the second terminal of the second light emission control module 1012 to be conductive. The on path of the first light emission control module 1011, the drive transistor DT, the second light emission control module 1012, and the light-emitting element 20 is formed between the first power signal Vpvdd and the second power signal Vpvee. The drive current drives the light-emitting element 20 to emit light. A control terminal of the bias adjustment module 102 is electrically connected to the bias adjustment signal SP1. Under the control of the bias adjustment signal SP1, whether or not the first terminal and second terminal of the bias adjustment module 102 are conductive is implemented. During the driving process of the display panel 000, in the bias voltage adjustment stage of the pixel circuit 10, the bias adjustment signal SP1 controls the first terminal and the second terminal of the bias adjustment module 102 to be conductive. The bias voltage signal VD is transmitted to the first pole of the drive transistor DT. The bias state of the drive transistor DT is adjusted, so that the drive transistor DT is reverse biased. The first pole and the second pole of the drive transistor DT are inverted. In this manner, the degree of polarization of ions inside the drive transistor DT is weakened, and the threshold voltage of the drive transistor DT is reduced. Thus, the forward bias state of the drive transistor DT is compensated, so that the threshold voltage drift is caused by the hysteresis effect of the drive transistor DT, and the impact of the hysteresis effect of the drive transistor DT on the display effect in the display panel 000 is alleviated, thereby improving the display effect.

It is to be understood that in this embodiment, FIG. 2 is merely an illustration of the electrical connection structure of the sub-pixel P in the display panel 000. For example, the electrical connection structure of the sub-pixel P may also include other modules, such as a data write module and a reset module. This is not limited in this embodiment. For details, reference may be made to the description of the subsequent embodiments for understanding. In this embodiment, description is given with reference to the figure by using an example in which the drive transistor DT is a P-type transistor, and the transistors included in the light emission control module 101 and the bias adjustment module 102 are P-type transistors. That is, when the light emission control signal EM is at a high level, the first terminal and the second terminal of the light emission control module 101 are not conductive; when the light emission control signal EM is at a low level, the first terminal and a second terminal of the light emission control module 101 are conductive; when the bias adjustment signal SP1 is at a high level, the first terminal and the second terminal of the bias adjustment module 102 are not conductive; and when the bias adjustment signal SP1 is at a low level, the first terminal and the second terminal of the bias adjustment module 102 are conductive. For example, the drive transistor DT and the transistors included in the modules of the pixel circuit may also be N-type transistors. This is not limited in this embodiment.

In the related art, during the driving process of a frequency-convertible display panel 000, if frequency reduction is performed on the fundamental frequency display frame to the low frequency display frame, the frequency reduction method may generally adopt two forms, namely frame skip and long-V. Frame skip refers to frequency reduction through frame insertion. For example, a frequency is reduced from 60 Hz to 30 Hz, and then the frequency may be composed of two frames of 60 Hz. The first frame is a data write frame, and the second frame is a data maintenance frame. Long_V refers to frequency reduction through the insertion of the pulse period of the light emission control signal EM, that is, the insertion of an EM pulse. For example, the frequency of the fundamental frequency display frame is 60 Hz, including 4 EM pulses. If the frequency is reduced to 30 Hz, the frequency is composed of 2 frames of 60 Hz, that is, 8 EM pulses. If the frequency is reduced to 40 Hz, 2 EM pulses may be inserted for implementation. At this time, one frame (4 EM pulses) is a data write time period, and 2 EM pulses are data maintenance time periods.

In the related art, the bias adjustment module 102 may reuse a module originally included in the pixel circuit 10 structure, for example, the data write module is reused. However, for a circuit in which the bias adjustment module 102 and the data write module are reused with each other, the frequency of data writing (that is, the frequency of bias adjustment) limits the frequency that can be reduced to, and the time of a data maintenance stage during frequency reduction is an integer multiple of a bias adjustment signal period. The frequency that does not satisfy the integer multiple relationship cannot be implemented. For example, frequency reduction is performed in the form of long_V. Although the frequency can be reduced from 60 to 40 Hz, the bias adjustment signal SP1 constituting periodicity cannot be controlled to control the bias voltage signal VD to be written at a frequency that is an integer multiple of the periodicity. As a result, the adjustment of the bias state of the drive transistor DT is affected, and the display quality of the display panel is easily affected.

In the related art, the bias adjustment module 102 may also not reuse a module originally included in the pixel circuit 10 structure. That is, an additional bias adjustment module 102 is configured. However, for the pixel circuit 10 in which the additional bias adjustment module 102 is configured, the frequency of bias adjustment also limits the frequency that can be reduced to. The bias adjustment signal SP1 is used to control the bias voltage signal VD for bias adjustment. The time of the data maintenance stage during frequency reduction is an integer multiple of the bias adjustment signal period. The frequency that does not satisfy the integer multiple relationship cannot be implemented. For example, frequency reduction is performed in the form of long_V. Although the frequency can be reduced from 60 to 40 Hz, the bias adjustment signal SP1 constituting periodicity cannot be controlled to control the bias voltage signal VD to be written at a frequency that is an integer multiple of the periodicity. It cannot be ensured that a complete frame is inserted to ensure that the bias voltage signal VD can be completely written. Further, the adjustment of the bias state of the drive transistor DT may also be affected, and the display quality is still easily affected.

When the display panel is at a high refresh frequency (that is, high-frequency driving), and when the frequency of bias adjustment is too high, apparent changes in brightness are caused, resulting in poor display at high-frequency driving. This is because the effect of bias adjustment may be equal to the product of the action of the bias voltage signal VD and the time (or the number of times) of bias adjustment. When the value of the bias voltage signal VD does not change, the increase in the number of times of bias adjustment may result in the increase in the effect of bias adjustment. When the effect of bias adjustment is greater than a preset required value, an abnormal change in brightness is prone to occur. For example, commonly, if the number of times of bias adjustment increases, the negative drift of the drive transistor DT may exceed expectation, and the brightness is abnormal.

In the related art, during frequency reduction of the panel, to ensure that a complete frame is inserted to ensure that the voltage of the bias voltage signal is completely written to ensure the display quality, for example, when the refresh frequency of the fundamental frequency display frame is 120 Hz, generally, frequency reduction is performed only in the form of frame skip. For this reason, the frequency can only be reduced to 120 Hz/Q (Q is a positive integer other than 1). Thus, the switching of the current design frequency is limited, and requirements for different high and low frequencies cannot be applied.

In the driving method provided by this embodiment, the display panel 000 to which the driving method is applied includes a fundamental frequency display frame and a low frequency display frame. The fundamental frequency display frame may be understood as a display frame under a fundamental refresh frequency before the display panel 000 performs a frequency reduction operation. The low frequency display frame may be understood as a display frame under a low refresh frequency after the display panel 000 performs the frequency reduction operation. The refresh frequency of the fundamental frequency display frame and the refresh frequency of the low frequency display frame are not limited in this embodiment. It is only required that the refresh frequency of the fundamental frequency display frame is greater than the refresh frequency of the low frequency display frame, and the low frequency display frame refers to a display frame after the display panel 000 performs the frequency reduction operation.

As shown in FIG. 3, in the fundamental frequency display frame, the light emission control signal EM includes the light emission control period T-EM. The light emission control period T-EM may be understood as the time occupied by one pulse period of the light emission control signal EM. The bias adjustment signal SP1 includes the bias adjustment period T-SP1. The bias adjustment period T-SP1 may be understood as the time occupied by one pulse period of the bias adjustment signal SP1. The bias adjustment period T-SP1 is M times greater than the light emission control period T-EM. M is a positive integer. In this embodiment, description is given with reference to the figure by using an example in which the light emission control signal EM includes 4 pulses, and the bias adjustment signal SP1 includes 1 pulse, that is, the bias adjustment period T-SP1 is 4 times greater than the light emission control period T-EM (M is 4). There may be other arrangements. This is not limited in this embodiment.

As shown in FIG. 3, the fundamental frequency display frame includes the fundamental frequency scan stage J0. The time of the fundamental frequency scan stage J0 is N times greater than the light emission control period T-EM. N is a positive integer greater than or equal to 2. The time of the fundamental frequency scan stage J0 may be understood as the time of scanning from the first row of sub-pixels P to the last row of sub-pixels P in the driving process of the display panel 000. That is, the scanning of all sub-pixel rows in the display panel 000 is completed in the fundamental frequency scan stage J0. In this embodiment, description is given with reference to FIG. 3 by using an example in which the time of the fundamental frequency scan stage J0 is 4 times greater than the light emission control period T-EM, that is, N takes 4. For example, N may also take 6, 8, or other positive integers greater than or equal to 2. This is not limited in this embodiment.

As shown in FIG. 4, in the driving method of a display panel 000 of this embodiment, after the frequency reduction operation is performed on the display panel 000, the low frequency display frame may include a fundamental frequency scan stage J0 and a blank stage J1. The blank stage J1 includes at least the non-bias stage J11. The time of the non-bias stage J11 is L times greater than the light emission control period T-EM. L is not an integer multiple of M. That is, under low-frequency driving after frequency reduction, bias voltage adjustment is not performed on the inserted blank stage J1. The bias adjustment signal SP1 is not a valid pulse signal. The bias adjustment signal SP1 controls the first terminal and the second terminal of the bias adjustment module 102 not to be conductive. The bias voltage signal VD is not written. The bias adjustment module 102 does not perform bias adjustment on the drive transistor DT in the pixel circuit 10. In this manner, the frequency of bias adjustment may be prevented from limiting the frequency that can be reduced to, thereby making the refresh frequency of the low frequency display frame more flexible. The blank stage J1 includes the non-bias stage J11. Bias voltage adjustment is not performed on the non-bias stage J11. The pulse period of the light emission control signal EM is inserted, that is, the EM pulse is inserted, so that low-frequency driving of the low frequency display frame is implemented. As shown in FIG. 4, the time of the fundamental frequency scan stage J0 is N times greater than the light emission control period T-EM (N is 4 as shown in FIG. 4). The time of the non-bias stage J11 is L times greater than the light emission control period T-EM (L is 2 as shown in FIG. 4, that is, the time of the non-bias stage J11 includes 2 light emission control periods T-EM). L is not an integer multiple of M (2 is not an integer multiple of 4).

It is to be understood that in this embodiment, description is given with reference to FIGS. 3 and 4 by using an example in which the bias adjustment module 102 reuses the data write module originally included in the pixel circuit 10 structure. When the bias adjustment module 102 reuses the data write module in the pixel circuit 10, the bias adjustment signal SP1 is reused as a data write control signal. In the fundamental frequency scan stage J0 of the fundamental frequency display frame, during the scan period of one row of sub-pixels, the bias adjustment signal SP1 of the bias adjustment period T-SP1 needs to include multiple valid pulses (description is given with reference to the figure by using an example in which the valid signal of the bias adjustment signal SP1 includes two valid pulses). During the scan period of one row of sub-pixels, when the first valid signal of the bias adjustment signal SP1 is the first low level as shown in the figure, the bias adjustment signal SP1 is used as the data write control signal to control the writing of a data voltage signal Vdata. When the second valid signal of the bias adjustment signal SP1 is the second low level as shown in the figure, the bias adjustment signal SP1 controls the writing of the bias voltage signal VD (the data voltage signal Vdata is reused as the bias voltage signal VD) to adjust the bias state of the drive transistor DT. As shown in FIG. 4, in the fundamental frequency scan stage J0 of the low frequency display frame, during the scan period of each row of sub-pixels, the bias adjustment signal SP1 may be used as the data write control signal to control the writing of the data voltage signal Vdata and may also control the writing of the bias voltage signal VD to adjust the bias state of the drive transistor DT. In the non-bias stage J11 of the low frequency display frame, the bias adjustment signal SP1 is an invalid signal, that is, the bias adjustment signal SP1 shown in FIG. 4 is always at a high level without bias adjustment. In FIG. 4, for example, the display panel 000 includes H rows of sub-pixels. SP1-1 indicates the bias adjustment signal SP1 of the scan period of the first row of sub-pixels. SP1-2 indicates the bias adjustment signal SP1 of the scan period of the second row of sub-pixels . . . SP1-H indicates the bias adjustment signal SP1 of the scan period of the last row of sub-pixels, that is, the Hth row of sub-pixels. In this embodiment, in the non-bias stage J11 of the low frequency display frame, no bias adjustment is performed in the scan period of all rows of sub-pixels. FIG. 4 only shows the light emission control signal EM corresponding to the first row of sub-pixels. It is to be noted that FIG. 3 merely illustrates the timing of the bias adjustment signal SP1 of the scan period of one row of sub-pixels. Actually, all rows of sub-pixels in the display panel 000 are driven by the bias adjustment signal SP1. Reference may be made to the bias adjustment signal SP1 of H rows of sub-pixels shown in FIG. 4 for understanding, and the details are not repeated in this embodiment.

Thus, if the refresh frequency of the fundamental frequency display frame illustrated in FIG. 3 is 120 Hz, the period of the fundamental frequency display frame is $\frac{1}{120}$ seconds. The light emission control signal EM includes 4 pulses. The light emission control period T-EM is $\frac{1}{480}$ seconds. The time of the fundamental frequency scan stage J0 is $\frac{1}{120}$ seconds. The bias adjustment signal SP1 includes 1 pulse. The time of the fundamental frequency scan stage J0 multiplied by 1 is required to complete bias adjustment of all rows of sub-pixels of the display panel 000. That is, the light emission control signal EM includes the time of 4 pulses (the light emission control period T-EM). That is, the bias adjustment period T-SP1 is 4 times greater than the light emission control period T-EM (M is 4). After the frequency reduction operation is performed on the display panel 000 in the fundamental frequency display frame to the low frequency display frame, the time of the fundamental frequency scan stage is $\frac{1}{120}$ seconds. The time of the non-bias stage is 2 times greater than the light emission control period (L is 2). The time of the non-bias stage included in the low frequency display frame is $\frac{2}{480}$ seconds. The period of the low frequency display frame is ($\frac{1}{120}+\frac{2}{480}$) seconds, that is, $\frac{1}{80}$ seconds. The refresh frequency of the low frequency display frame is 80 Hz. Alternatively, after the frequency reduction operation is performed on the display panel 000 in the fundamental frequency display frame to the low frequency display frame, the time of the fundamental frequency scan stage is $\frac{1}{120}$ seconds. The time of the non-bias stage is the light emission control period multiplied by 1 (L is 1 and not shown in the drawings). The time of the non-bias stage included in the low frequency display frame is $\frac{1}{480}$ seconds. The period of the low frequency display frame is ($\frac{1}{120}+\frac{1}{480}$) seconds, that is, $\frac{1}{96}$ seconds. The refresh frequency of the low frequency display frame is 96 Hz. It can be seen that in the driving method of a display panel 000 of this embodiment, the refresh frequency of the display panel 000 may be reduced from 120 Hz to 80 Hz, and the refresh frequency of the display panel 000 may also be reduced from 120 Hz to 96 Hz. Alternatively, the refresh frequency may also be reduced to other frequencies. Then, the quotient of the refresh frequency of the fundamental frequency display frame and the refresh frequency of the low frequency display frame is not a positive integer other than 1. That is, the refresh frequency of the fundamental frequency display frame is not an integer multiple of the refresh frequency of the low frequency display frame. Thus, the display panel 000 has more switchable frequency options for frequency reduction, and various switching requirements of different high and low frequencies can be satisfied.

Alternatively, if the refresh frequency of the fundamental frequency display frame illustrated in FIG. 3 is 60 Hz, the period of the fundamental frequency display frame is $\frac{1}{60}$ seconds. The light emission control signal EM includes 4 pulses. The light emission control period T-EM is $\frac{1}{240}$ seconds. The time of the fundamental frequency scan stage J0 is $\frac{1}{60}$ seconds. The bias adjustment signal SP1 includes 1 pulse. That is, the bias adjustment period T-SP1 is 4 times greater than the light emission control period T-EM (M is 4). After the frequency reduction operation is performed on the display panel 000 in the fundamental frequency display frame to the low frequency display frame, the time of the fundamental frequency scan stage is $\frac{1}{60}$ seconds. The time of the non-bias stage is 2 times greater than the light emission control period (L is 2). The time of the non-bias stage included in the low frequency display frame is $\frac{2}{240}$ seconds. The period of the low frequency display frame is ($\frac{1}{60}+\frac{2}{240}$) seconds, that is, $\frac{1}{40}$ seconds. The refresh frequency of the low frequency display frame is 40 Hz. It can be seen that in the driving method of a display panel 000 of this embodiment, the refresh frequency of the display panel 000 may be reduced from 60 Hz to 40 Hz. Then, the quotient of the refresh frequency of the fundamental frequency display frame and the refresh frequency of the low frequency display frame is not a positive integer other than 1. That is, the refresh frequency of the fundamental frequency display frame is not an integer multiple of the refresh frequency of the low frequency display frame. Thus, the display panel 000 has more switchable frequency options for frequency reduction, and various switching requirements of different high and low frequencies can be satisfied.

It is to be noted that in this embodiment, the structure of the display panel 000 includes, but is not limited to, the preceding structure. For example, the display panel 000 may include other structures that can implement display functions, and the details are not repeated in this embodiment. For details, reference may be made to the structure of an organic light-emitting diode display panel in the related art for understanding.

In some embodiments, referring to FIGS. 1 to 3 and 5, FIG. 5 is another diagram of the drive period of the display panel in multiple low frequency display frames in the driving method according to an embodiment of the present disclosure. In this embodiment, the blank stage J1 also includes a bias stage J12. The time of the bias stage J12 is an integer multiple of the bias adjustment period T-SP1.

Figure 5:
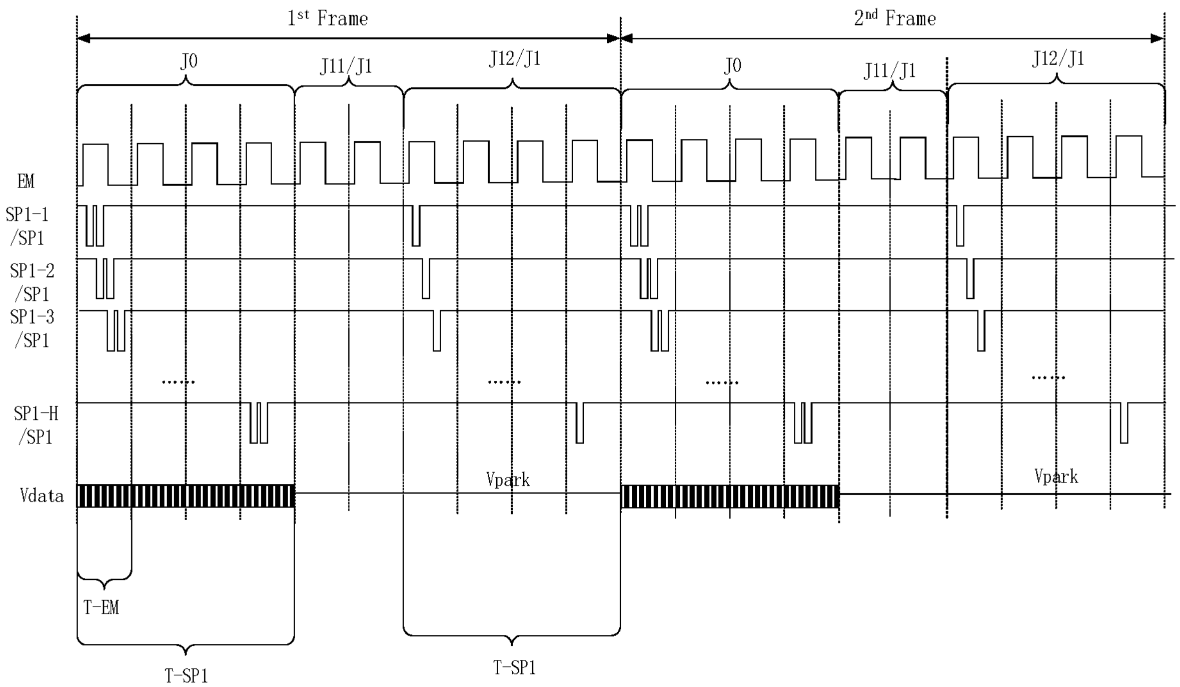
FIG. 5 is another diagram of the drive period of the display panel in multiple low frequency display frames in the driving method according to an embodiment of the present disclosure.
Figure 6:
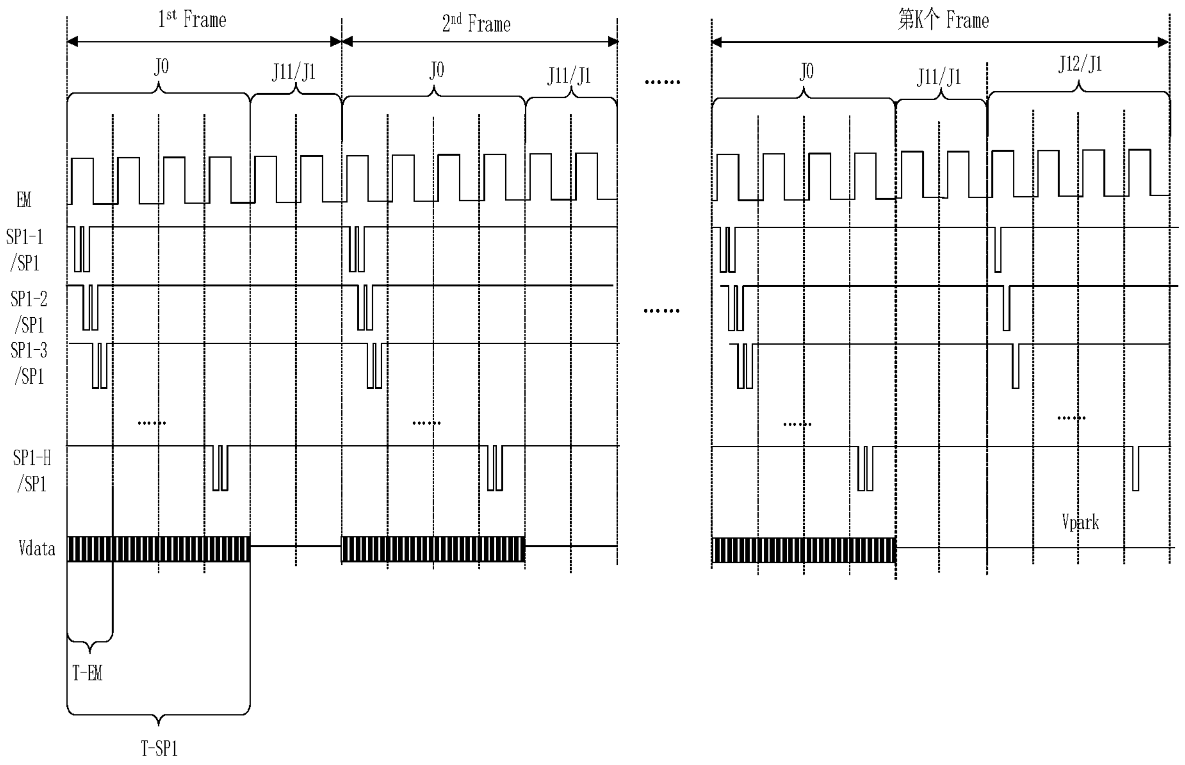
FIG. 6 is another diagram of the drive period of the display panel in multiple low frequency display frames in the driving method according to an embodiment of the present disclosure.

This embodiment illustrates that the display panel 000 to which the driving method is applied includes a fundamental frequency display frame and a low frequency display frame. The fundamental frequency display frame may be understood as a display frame under a fundamental refresh frequency before the display panel 000 performs the frequency reduction operation. The low frequency display frame may be understood as a display frame under a low refresh frequency after the display panel 000 performs the frequency reduction operation. As shown in FIG. 3, the fundamental frequency display frame includes the fundamental frequency scan stage J0. The time of the fundamental frequency scan stage J0 is N times greater than the light emission control period T-EM. N is a positive integer greater than or equal to 2. The time of the fundamental frequency scan stage J0 may be understood as the time of scanning from the first row of sub-pixels P to the last row of sub-pixels P in the driving process of the display panel 000. That is, the scanning of all sub-pixel rows in the display panel 000 is completed in the fundamental frequency scan stage J0. In this embodiment, description is given with reference to FIG. 3 by using an example in which the time of the fundamental frequency scan stage J0 is 4 times greater than the light emission control period T-EM, that is, N takes 4. N may also take 6, 8, or other positive integers greater than or equal to 2. This is not limited in this embodiment. As shown in FIG. 5, in the driving method of a display panel 000 of this embodiment, after the frequency reduction operation is performed on the display panel 000, the low frequency display frame may include a fundamental frequency scan stage J0 and a blank stage J1. The blank stage J1 includes at least the non-bias stage J11. The blank stage J1 also includes the bias stage J12. The time of the non-bias stage J11 is L times greater than the light emission control period T-EM. L is not an integer multiple of M. The time of the bias stage J12 is an integer multiple of the bias adjustment period T-SP1. That is, bias voltage adjustment is not performed on the inserted non-bias stage J11, and the bias adjustment signal SP1 is not a valid pulse signal. The bias adjustment signal SP1 controls the first terminal and the second terminal of the bias adjustment module 102 not to be conductive. The bias voltage signal VD is not written. The bias adjustment module 102 does not perform bias adjustment on the drive transistor DT in the pixel circuit 10. In this manner, the frequency of bias adjustment may be prevented from limiting the frequency that can be reduced to, thereby making the refresh frequency of the low frequency display frame more flexible. Bias voltage adjustment may be performed on the inserted bias stage J12. The time of the bias stage J12 is an integer multiple of the bias adjustment period T-SP1. The bias adjustment signal SP1 may be configured as a valid pulse signal (such as a low-level signal in FIG. 5). The bias adjustment signal SP1 controls the first terminal and the second terminal of the bias adjustment module 102 to be conductive. The bias voltage signal VD is written. The bias adjustment module 102 performs bias adjustment on the drive transistor DT in the pixel circuit 10. The writing of the bias voltage signal VD may be used to perform bias voltage adjustment on the drive transistor DT. In this manner, the drive transistor DT is reverse biased. The first pole and the second pole of the drive transistor DT are inverted. Then, the degree of polarization of ions inside the drive transistor DT is weakened, and the threshold voltage of the drive transistor DT is reduced. Moreover, the impact of the hysteresis effect of the drive transistor DT on the display effect in the display panel 000 can be alleviated, thereby improving the display effect. Thus, in the driving method of a display panel 000 of this embodiment, the blank stage J1 is configured to include the non-bias stage J11 and the bias stage J12. In this manner, the controllability of the refresh frequency of the low frequency display frame after frequency reduction may be ensured to be more flexible. Thus, the display panel 000 has more switchable frequency options for frequency reduction, various switching requirements of different high and low frequencies can be satisfied, and at the same time, the bias voltage signal VD may also be written through the inserted bias stage J12, thereby ensuring the display quality of the display panel 000.

It is to be understood that in this embodiment, description is given with reference to FIGS. 3 and 5 by using an example in which the bias adjustment module 102 reuses the data write module originally included in the pixel circuit 10 structure. When the bias adjustment module 102 reuses the data write module in the pixel circuit 10, the bias adjustment signal SP1 is reused as the data write control signal. As shown in FIG. 5, in the fundamental frequency scan stage J0 of the low frequency display frame, during the scan period of each row of sub-pixels, the bias adjustment signal SP1 may be used as the data write control signal to control the writing of the data voltage signal Vdata and may also control the writing of the bias voltage signal VD to adjust the bias state of the drive transistor DT. In the non-bias stage J11 of the low frequency display frame, the bias adjustment signal SP1 is an invalid signal. That is, the bias adjustment signal SP1 shown in FIG. 5 is always at a high level without bias adjustment. In the bias stage J12 of the low frequency display frame, the bias adjustment signal SP1 is a valid signal. That is, bias adjustment is performed on the low level of one pulse shown in FIG. 5. Since in the bias stage J12, only bias adjustment needs to be performed, and the bias adjustment signal SP1 does not need to be reused as the data write control signal for the writing of the data voltage signal, the bias adjustment signal SP1 of the bias stage J12 is a valid signal of one pulse.

In some embodiments, further referring to FIGS. 1 to 4, in this embodiment, the frequency of the fundamental frequency display frame is a first frequency. When the refresh frequency of the low frequency display frame is greater than or equal to half of the first frequency, the blank stage J1 includes only the non-bias stage J11.

This embodiment illustrates that when the frequency of the fundamental frequency display frame is the first frequency, and the refresh frequency of the low frequency display frame after frequency reduction is required to be greater than or equal to half of the first frequency, the blank stage J1 of the low frequency display frame may be configured to include only the non-bias stage J11, that is, the low frequency display frame does not need bias voltage adjustment. Even if frequency reduction is performed (the refresh frequency of the low frequency display frame is less than the refresh frequency of the fundamental frequency display frame, that is, the refresh frequency of the low frequency display frame is less than the first frequency of the fundamental frequency display frame), the refresh frequency of the low frequency display frame after frequency reduction is still greater than or equal to half of the first frequency. It is to be understood that even if frequency reduction is performed, the frequency of the low frequency display frame is still in a relatively high-frequency situation (the reduction is relatively small). In this high-frequency situation, even if the brightness changes, it is relatively difficult to be detected since the changed frequency is high. In another aspect, the pulse period of the light emission control signal EM is inserted, that is, the EM pulse is inserted, so that low-frequency driving of the low frequency display frame is implemented. When the drive transistor DT is compensated in a data maintenance stage, the hysteresis of the drive transistor DT is not serious, and the caused brightness difference is smaller than the brightness difference in a low-frequency situation. Thus, bias voltage adjustment may not be performed, that is, the bias voltage signal VD is not written. The display difference perceived by a user is relatively small. It is to be understood that the display quality of the display panel 000 can still be ensured. The pulse period of the light emission control signal EM may be inserted, that is, the EM pulse may be inserted, so that the controllability of the refresh frequency of the low frequency display frame after frequency reduction may be more flexible. Thus, the display panel 000 has more switchable frequency options for frequency reduction, and various switching requirements of different high and low frequencies can be satisfied.

In some embodiments, further referring to FIGS. 1 to 4 and 6, FIG. 6 is another diagram of the drive period of the display panel in multiple low frequency display frames in the driving method according to an embodiment of the present disclosure. In this embodiment, the drive period of the display panel 000 includes K low frequency display frames. From the first low frequency display frame to the (K−1)th low frequency display frame, the blank stage J1 of each low frequency display frame includes only the non-bias stage J11. The blank stage J1 of the Kth low frequency display frame includes a bias stage J12. K is a positive integer less than or equal to 10.

This embodiment illustrates that during the drive period of the display panel 000, after frequency reduction is performed on the fundamental frequency display frame to the low frequency display frame, in the K low frequency display frames included in the drive period of the display panel 000, in first K−1 low frequency display frames, that is, from the first low frequency display frame to the (K−1)th low frequency display frame, the blank stage J1 of each low frequency display frame may be configured to include only the non-bias stage J11. That is, in the K low frequency display frames included in the drive period of the display panel 000, the blank stages J1 of the first K−1 low frequency display frames include only non-bias stages J11. The first K−1 low frequency display frames do not need bias voltage adjustment. Although frequency reduction is performed, the frequency of the low frequency display frame after frequency reduction is still relatively high. For example, the frequency is greater than half of the first frequency of the fundamental frequency display frame. Even if the brightness changes, it is relatively difficult to be detected since the changed frequency is high. Thus, bias voltage adjustment may not be performed. However, after continuous multi-frame high-frequency low frequency display frames (such as K−1 low frequency display frames), the blank stage J1 of the Kth low frequency display frame may be configured to include the bias stage J12. Thus, bias voltage adjustment is performed on the last frame of the K low-frequency display frames to compensate for the display deviation caused by the absence of bias voltage adjustment in the previous frames. For example, when K is 10, the blank stages J1 of the first low frequency display frame to the ninth low frequency display frame include only non-bias stages J11, and the blank stage J1 of the tenth low frequency display frame includes the bias stage J12. Alternatively, when K is 3 (not shown in the drawings), the blank stages J1 of the first low frequency display frame to the second low frequency display frame include only non-bias stages J11, and the blank stage J1 of the third low frequency display frame includes the bias stage J12. In this manner, the display situation caused by the absence of bias voltage adjustment of more low frequency display frames is avoided. Thus, the controllability of the refresh frequency of the low frequency display frame after frequency reduction may be more flexible, and at the same time, the display quality can be ensured by performing the bias stage J12 once among multiple non-bias stages J11.

In some embodiments, as shown in FIGS. 1 to 5 and 7, FIG. 7 is another diagram of the drive period of the display panel in multiple low frequency display frames in the driving method according to an embodiment of the present disclosure. In this embodiment, the drive period of the display panel 000 includes multiple low frequency display frames. The odd-numbered low frequency display frame may include only the non-bias stage J11. The even-numbered low frequency display frame may include only the bias stage J12. That is, the non-bias stage J11 and the bias stage J12 of the multiple low frequency display frames may be alternately performed. The first low frequency display frame may include only the non-bias stage J11, that is, bias adjustment is not performed. The next low frequency display frame, that is, the second low frequency display frame, may include only the bias stage J12, that is, bias adjustment is performed. In this manner, frequency reduction is implemented, and at the same time, it is ensured that one low frequency display frame with bias adjustment is included between two adjacent low frequency display frames without bias adjustment, thereby further improving the display quality.

Figure 7:
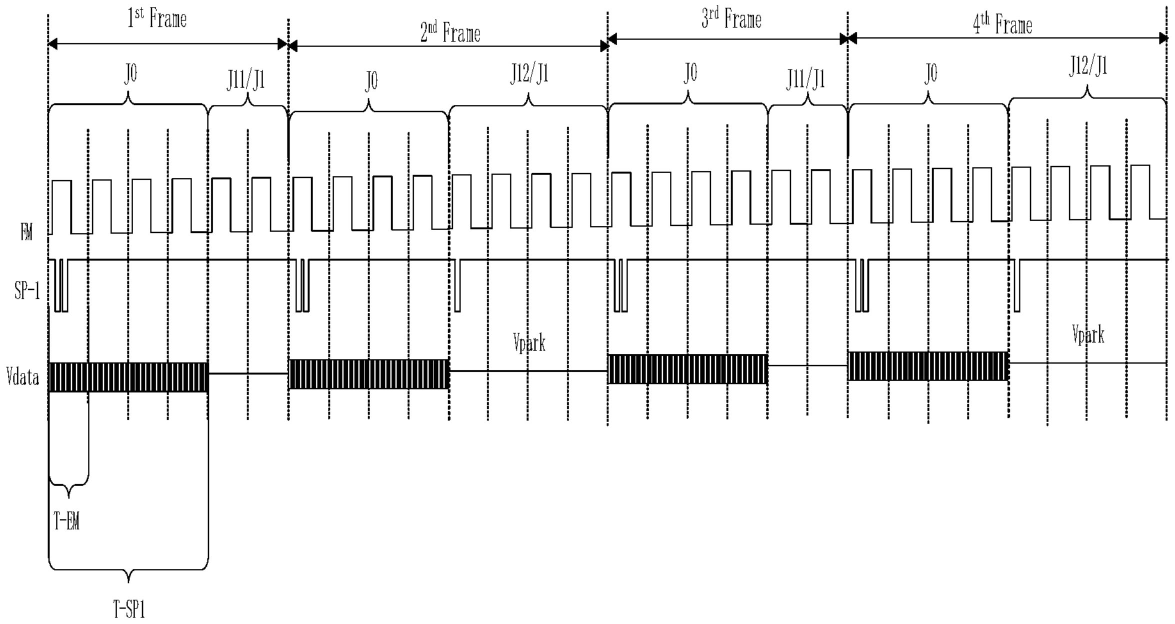
FIG. 7 is another diagram of the drive period of the display panel in multiple low frequency display frames in the driving method according to an embodiment of the present disclosure.

It is to be understood that FIG. 7 merely illustrates the timing of the bias adjustment signal SP1 of the scan period of one row of sub-pixels. Actually, all rows of sub-pixels in the display panel 000 are driven by the bias adjustment signal SP1. Reference may be made to the bias adjustment signal SP1 of H rows of sub-pixels shown in FIG. 4 for understanding, and the details are not repeated in this embodiment.

Figure 8:
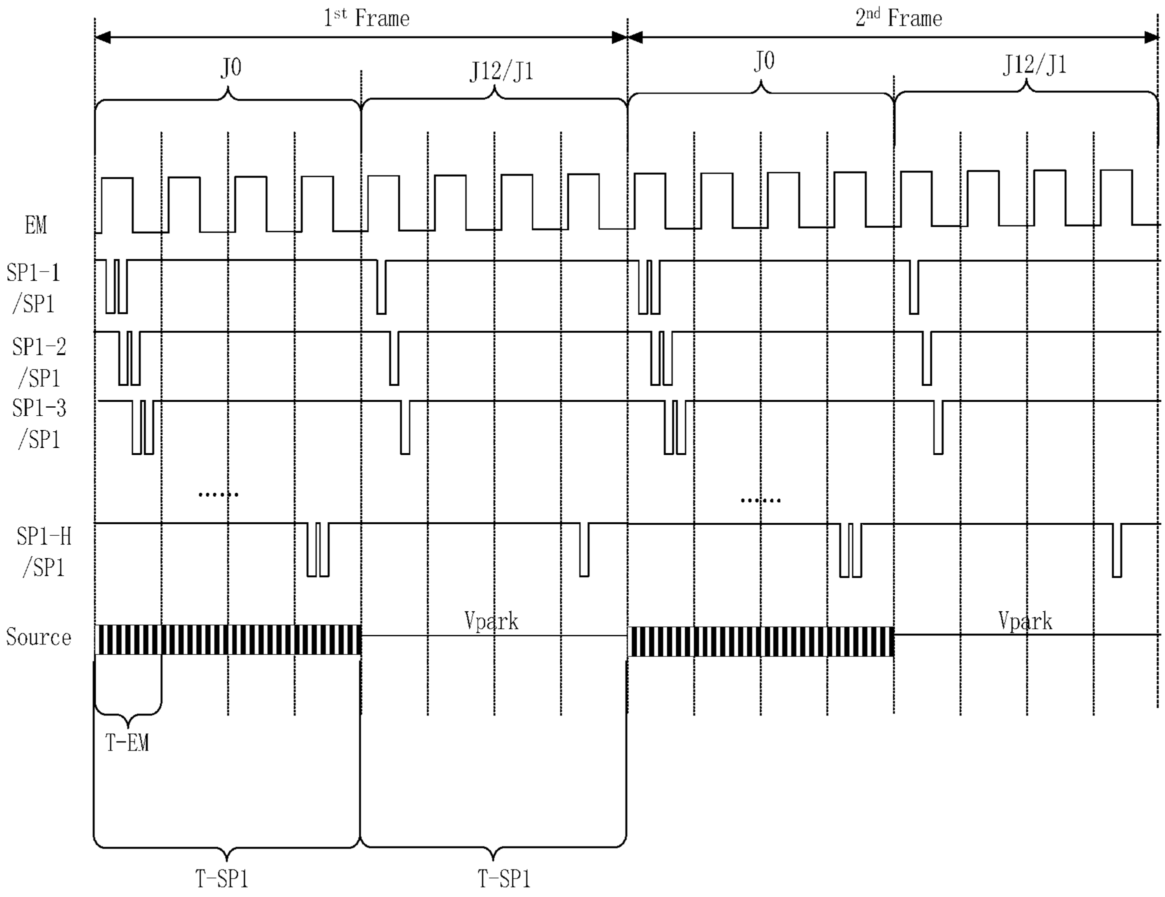
FIG. 8 is another diagram of the drive period of the display panel in multiple low frequency display frames in the driving method according to an embodiment of the present disclosure.

In some embodiments, referring to FIGS. 1 to 3, 5, and 8, FIG. 8 is another diagram of the drive period of the display panel in multiple low frequency display frames in the driving method according to an embodiment of the present disclosure. In this embodiment, the frequency of the fundamental frequency display frame is the first frequency. When the refresh frequency of the low frequency display frame is less than half of the first frequency, as shown in FIG. 8, the blank stage J1 includes the bias stage J12. Alternatively, as shown in FIG. 5, the blank stage J1 includes at least one non-bias stage J11 and at least one bias stage J12.

This embodiment illustrates that when the frequency of the fundamental frequency display frame is the first frequency, and the refresh frequency of the low frequency display frame after frequency reduction is required to be less than half of the first frequency, the blank stage J1 of the low frequency display frame may be configured to include the bias stage J12. That is, the low frequency display frame needs bias adjustment. Frequency reduction is performed (the refresh frequency of the low frequency display frame is less than the refresh frequency of the fundamental frequency display frame, that is, the refresh frequency of the low frequency display frame is less than the first frequency of the fundamental frequency display frame), but the refresh frequency of the low frequency display frame after frequency reduction is still less than half of the first frequency. For this reason, it is to be understood that after frequency reduction is performed, the refresh frequency of the low frequency display frame is still in a relatively low-frequency situation (the reduction is relatively great). In this low-frequency situation, if the brightness changes, it is relatively easy to be detected since the changed frequency is relatively low (in a high-frequency situation, even if the brightness changes, it is relatively difficult to be detected since the changed frequency is high). Thus, the blank stage J1 needs to be configured to include the bias stage J12 for bias adjustment to alleviate the display impact caused by the brightness difference. That is, a frequency reduction operation is performed through a frame insertion method. In the bias stage J12 of the low frequency display frame, the bias voltage signal VD is written. Bias voltage adjustment is performed on the drive transistor DT. In this manner, the drive transistor DT is reverse biased. The first pole and the second pole of the drive transistor DT are inverted. Then, the degree of polarization of ions inside the drive transistor DT is weakened, and the threshold voltage of the drive transistor DT is reduced. Moreover, the impact of the hysteresis effect of the drive transistor DT on the display effect in the display panel 000 can be alleviated, thereby improving the display effect. Since the time of the inserted bias stage J12 is an integer multiple of the bias adjustment period T-SP1, the frequency of bias adjustment also does not limit the frequency that can be reduced to. Alternatively, as shown in FIG. 5, the blank stage J1 includes at least one non-bias stage J11 and at least one bias stage J12. The non-bias stage J11 is configured, and the pulse period of the light emission control signal EM is inserted, that is, the EM pulse is inserted, so that the controllability of the refresh frequency of the low frequency display frame after frequency reduction may be more flexible. Thus, the display panel 000 has more switchable frequency options for frequency reduction, and various switching requirements of different high and low frequencies can be satisfied. At least one bias stage J12 may be inserted, so that bias voltage adjustment is performed, thereby ensuring the display quality.

It is to be understood that in this embodiment, description is given with reference to FIG. 8 by using an example in which the bias adjustment module 102 reuses the data write module originally included in the pixel circuit 10 structure. When the bias adjustment module 102 reuses the data write module in the pixel circuit 10, the bias adjustment signal SP1 is reused as the data write control signal. As shown in FIG. 8, in the fundamental frequency scan stage J0 of the low frequency display frame, during the scan period of each row of sub-pixels, the bias adjustment signal SP1 may be used as the data write control signal to control the writing of the data voltage signal Vdata and may also control the writing of the bias voltage signal VD to adjust the bias state of the drive transistor DT. In the bias stage J12 of the low frequency display frame, the bias adjustment signal SP1 is a valid signal, that is, bias adjustment is performed on the low level of one pulse shown in FIG. 8. Since the bias stage J12 only needs to perform bias adjustment, and the bias adjustment signal SP1 does not need to be reused as the data write control signal for the writing of the data voltage signal, the bias adjustment signal SP1 of the bias stage J12 is a valid signal of one pulse.

In some embodiments, referring to FIGS. 1, 3 to 7, and 9, FIG. 9 is a diagram illustrating another electrical connection structure of the sub-pixel of FIG. 1. In this embodiment, the display panel 000 includes a pixel circuit 10 and a light-emitting element 20 electrically connected to the pixel circuit 10. The pixel circuit 10 is configured to drive the light-emitting element 20 to emit light.

The pixel circuit 10 includes at least a drive module, that is, a drive transistor DT, a data write module 103, and a light emission control module 101. The drive module, that is, the drive transistor DT, is configured to generate a drive current. The data write module 103 is configured to provide a data voltage signal Vdata for the drive module, that is, the drive transistor DT. The drive module, that is, the drive transistor DT, is electrically connected to the light emission control module 101.

A control terminal of the data write module 103 is connected to a data write control signal SP0. A first terminal of the data write module 103 is connected to the drive module, that is, the drive transistor DT. A second terminal of the data write module 103 is connected to the data voltage signal Vdata.

A control terminal of the light emission control module 101 is connected to a light emission control signal EM.

For example, the data write module 103 is reused as a bias adjustment module 102. The data write control signal SP0 is reused as a bias adjustment signal SP1.

Figure 9:
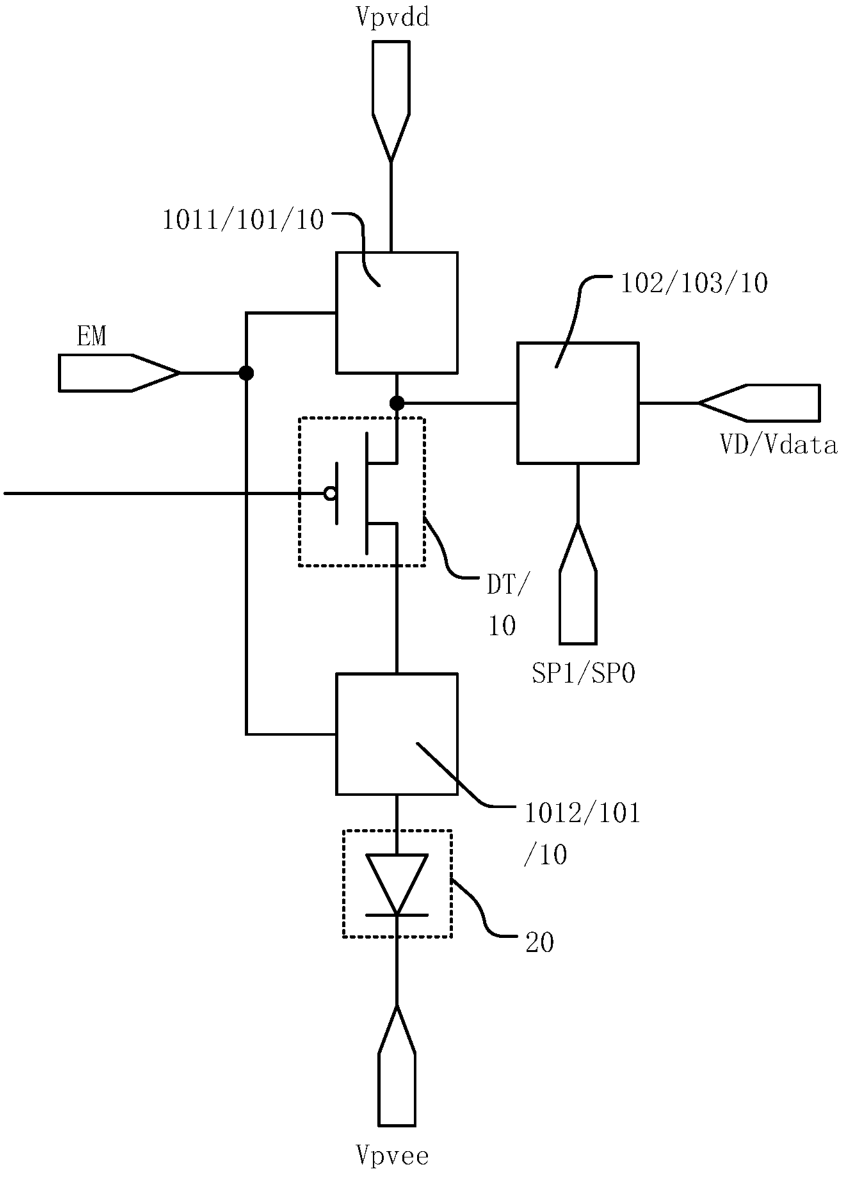
FIG. 9 is a diagram illustrating another electrical connection structure of the sub-pixel of FIG. 1.
Figure 10:
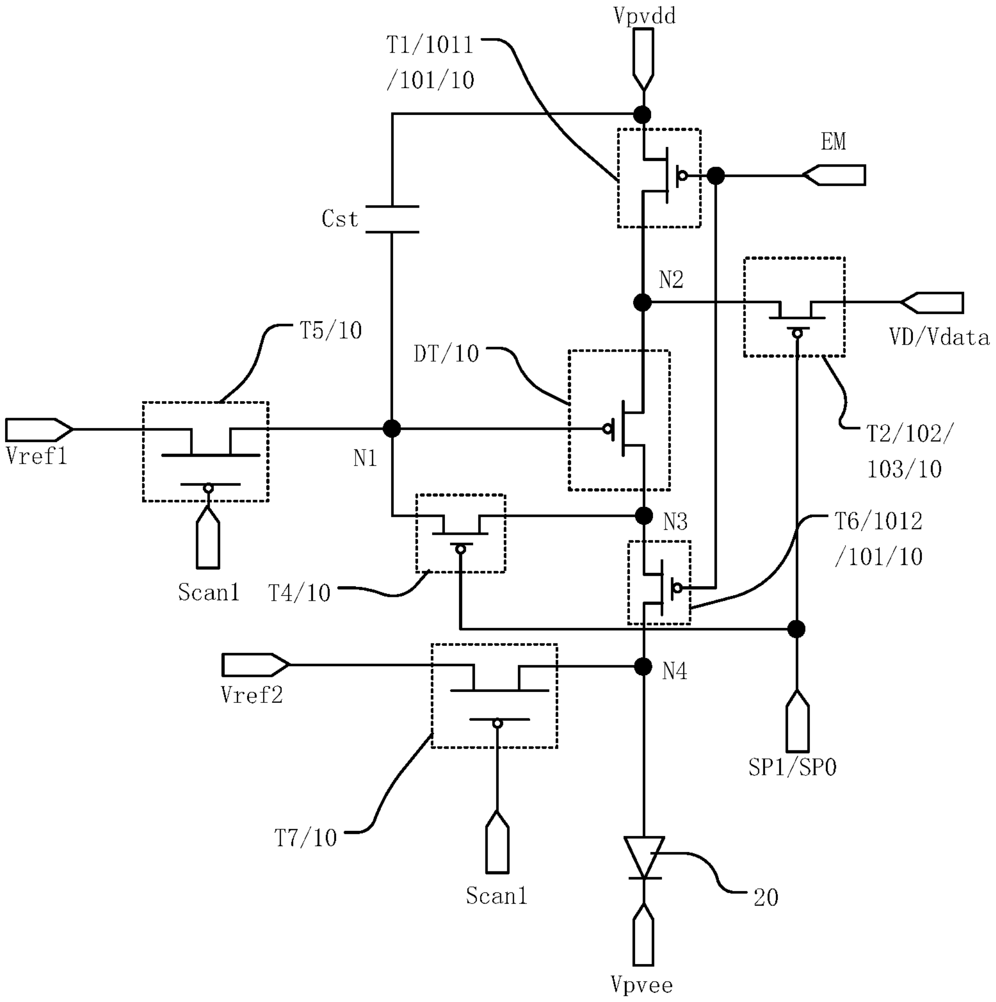
FIG. 10 is a circuit connection structure of FIG. 9.

As shown in FIG. 10, FIG. 10 is a circuit connection structure of FIG. 9. The sub-pixel P includes a pixel circuit 10 and a light-emitting element 20 electrically connected to the pixel circuit 10. The light-emitting element 20 may be an organic light-emitting diode. A first light emission control module 1011 includes a first transistor T1. A second light emission control module 1012 includes a sixth transistor T6. The data write module 103 is reused as the bias adjustment module 102. The bias adjustment module 102, that is the data write module 103, includes a second transistor T2. The pixel circuit 10 also includes a fourth transistor T4, a fifth transistor T5, a seventh transistor T7, and a storage capacitor Cst. A gate of the drive transistor DT is connected to a first pole of the fifth transistor T5. A second pole of the fifth transistor T5 is connected to a first reset signal Vref1. A gate of the fifth transistor T5 is connected to a first scan signal Scan1. A first pole of the drive transistor DT is connected to a first pole of the first transistor T1. A second pole of the first transistor T1 is connected to a first power signal Vpvdd. A gate of the first transistor T1 is connected to the light emission control signal EM. The first pole of the drive transistor DT is also connected to a first pole of the second transistor T2. A second pole of the second transistor T2 is connected to the data voltage signal Vdata. A gate of the second transistor T2 is connected to the data write control signal SP0, that is, the bias adjustment signal SP1.

A second pole of the drive transistor DT is connected to a first pole of the sixth transistor T6. A second pole of the sixth transistor T6 is connected to the anode of the light-emitting element 20. The cathode of the light-emitting element 20 is connected to a second power signal Vpvee. A gate of the sixth transistor T6 is also connected to the light emission control signal EM. That is, when the gate of the first transistor T1 and the gate of the sixth transistor T6 jointly respond to the light emission control signal EM, the first transistor T1 and the sixth transistor T6 are in an on state.

A first pole of the seventh transistor T7 is connected to a second reset signal Vref2. A second pole of the seventh transistor T7 is connected to the anode of the light-emitting element 20. A gate of the seventh transistor T7 is connected to the first scan signal Scan1. That is, when the gate of the fifth transistor T5 and the gate of the seventh transistor T7 jointly respond to the first scan signal Scan1, the fifth transistor T5 and the seventh transistor T7 are in an on state. For example, the second reset signal Vref2 and the first reset signal Vref1 may be different reset voltage signals or may be the same reset voltage signal. In this embodiment, description is given with reference to the figure by using an example in which the second reset signal Vref2 and the first reset signal Vref1 are different reset voltage signals and provided by different signal lines.

A first pole of the fourth transistor T4 is connected to the gate of the drive transistor DT. A second pole of the fourth transistor T4 is connected to the second pole of the drive transistor DT. A gate of the fourth transistor T4 is connected to the data write control signal SP0, that is, the bias adjustment signal SP1. That is, when the gate of the fourth transistor T4 and the gate of the second transistor T2 may jointly respond to the data write control signal SP0, that is, the bias adjustment signal SP1, the fourth transistor T4 and the second transistor T2 are in an on state.

One end of the storage capacitor Cst is connected to the first power signal Vpvdd, and the other end of the storage capacitor Cst is connected to the gate of the drive transistor DT. The storage capacitor Cst is configured to stabilize the potential of the gate of the drive transistor DT, so that the drive transistor DT is kept turned on.

This embodiment illustrates the circuit connection structure that the pixel circuit 10 in the display panel 000 may include. The pixel circuit 10 includes multiple transistors and a storage capacitor Cst. One transistor is the drive transistor DT, and the remaining transistors are switch transistors. In this embodiment, the structure in which the pixel circuit 10 and the light-emitting element 20 are electrically connected as shown in FIG. 10 is used as an example. The gate of the drive transistor DT represents a first node N1. The first pole of the drive transistor DT represents a second node N2. The second pole of the drive transistor DT represents a third node N3. The anode of the light-emitting element 20 is used as a fourth node N4. The working process of the sub-pixel P is below.

In an initial reset stage, the fifth transistor T5 and the seventh transistor T7 are turned on, and the remaining transistors are cut off. The potential of the first node N1 is the first reset signal Vref1. The potential of the fourth node N4 is the second reset signal Vref2. In this manner, the gate of the drive transistor DT and the anode of the light-emitting element 20 are reset.

In a data write stage and a threshold capture stage, the second transistor T2, the fourth transistor T4, and the drive transistor DT are turned on, and the remaining transistors are cut off. The potential of the second node N2 is the data voltage signal Vdata. The potential difference of the first node N1 and the third node N3 is $Vdata-|Vth|$. Vth is the threshold voltage of the drive transistor DT.

In a light emission stage, the first transistor T1, the sixth transistor T6, and the drive transistor DT are turned on, and the remaining transistors are cut off. The first power signal Vpvdd is transmitted to the drive transistor DT. The drive transistor DT generates a drive current to drive the light-emitting element 20 to emit light. The potential of the second node N2 is the first power signal Vpvdd. The potential of the first node N1 is $Vdata-|Vth|$. The potential of the third node N3 is $Vpvee+Voled$. Voled is the corresponding voltage on the light-emitting element 20, and the light emission current $Id=k\ (Vgs-|Vth|)^2=k\ (Vpvdd-Vdata-|Vth|)^2$. The constant k is related to the performance of the drive transistor DT.

This embodiment illustrates that the data write module 103 in the pixel circuit 10 may be reused as the bias adjustment module 102. That is, in the data write stage, the data write control signal SP0 is reused as the bias adjustment signal SP1. When the bias adjustment signal SP1 controls the first terminal and the second terminal of the bias adjustment module 102 to be conductive, the data voltage signal Vdata may be used to perform bias voltage adjustment on the drive transistor DT. Under the control of the data write control signal SP0, that is, the bias adjustment signal SP1, the data voltage signal Vdata, that is, the bias voltage signal VD, is provided to the first pole of the drive transistor DT to adjust the bias state of the drive transistor DT. In this manner, the drive transistor DT is reverse biased. The first pole and the second pole of the drive transistor DT are inverted. Then, the degree of polarization of ions inside the drive transistor DT is weakened, and the threshold voltage of the drive transistor DT is reduced. Moreover, the impact of the hysteresis effect of the drive transistor DT on the display effect in the display panel 000 can be alleviated, thereby improving the display effect. Since the data write module 103 is reused as the bias adjustment module 102, it is beneficial to reduce the number of transistors in the pixel circuit 10, and further, it is beneficial to increase the aperture ratio of the sub-pixel P in the panel, thereby saving the layout space of the panel.

In this embodiment, the bias adjustment module 102 reuses the data write module 103. The blank stage J1 of the low-frequency display frame includes the non-bias stage J11 and the bias stage J12. Even if the frequency of data writing (that is, the frequency of bias adjustment) limits the frequency that can be reduced to, the blank stage J1 may still be configured to include the bias stage J12, and the time of the bias stage J12 is an integer multiple of the bias adjustment period T-SP1. In this manner, the bias adjustment signal SP1 constituting periodicity controls the bias voltage signal VD to be written at a frequency that is an integer multiple of the periodicity. Then, the bias state of the drive transistor DT is adjusted. Thus, it is beneficial to make the frequency that can be reduced to diverse and flexible, and the display quality of the display panel can also be ensured.

Figure 11:
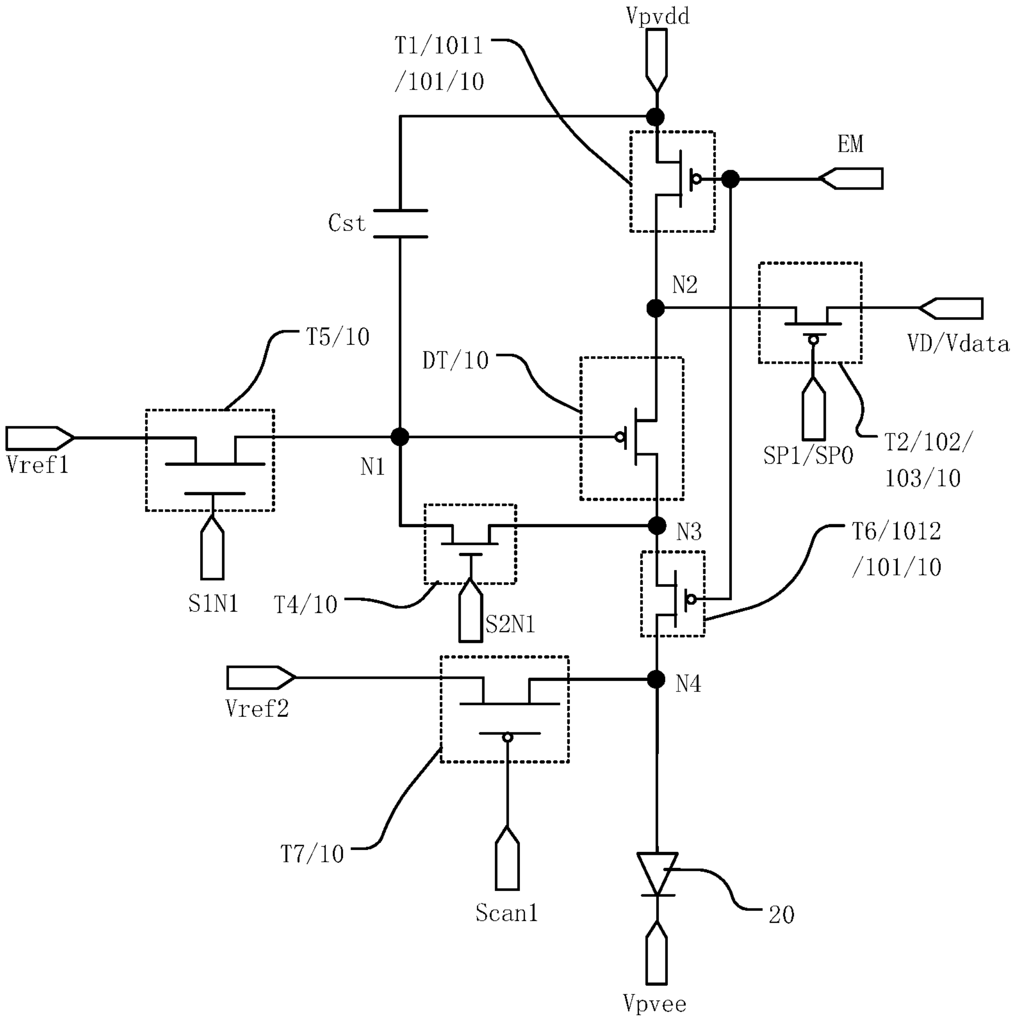
FIG. 11 is another circuit connection structure of FIG. 9.

Alternatively, as shown in FIG. 11, FIG. 11 is another circuit connection structure of FIG. 9. In this embodiment, the fifth transistor T5 and the fourth transistor T4 of the pixel circuit 10 may be N-type oxide transistors, such as N-type indium gallium zinc oxide (IGZO) transistors. The fifth transistor T5 and the fourth transistor T4 are turned on when scan signals connected to the gate of the fifth transistor T5 and the gate of the fourth transistor T4 respectively transmit high-level control signals. As shown in FIG. 11, the gate of the fifth transistor T5 is connected to a second scan signal S1N1. The gate of the fourth transistor T4 is connected to a third scan signal S2N1. Other transistors in the pixel circuit 10 may still be P-type low-temperature polycrystalline silicon transistors. The off-state leakage current of an IGZO transistor is relatively small. In this embodiment, the fifth transistor T5 and the fourth transistor T4 are electrically connected to the first node N1 of the drive transistor DT. In the light emission stage, there are two paths for gate leakage of the drive transistor DT. One leakage path is leakage through the fifth transistor T5, and the other leakage path is leakage through the fourth transistor T4. When the fifth transistor T5 and the fourth transistor T4 are selected as oxide transistors, the leakage path of the first node N1 may be reduced. Thus, the leakage current of the pixel circuit 10 can be reduced, and at the same time, the potential changing amplitude of the first node N1 can also be effectively reduced. That is, it is beneficial to maintain the potential of the first node N1 of the drive transistor DT, so that the drive current generated by the drive transistor DT is more accurate, thereby further improving the display effect.

In some embodiments, referring to FIGS. 1, 3 to 7, and 12, FIG. 12 is a diagram illustrating another electrical connection structure of the sub-pixel of FIG. 1. In this embodiment, the display panel 000 includes a pixel circuit 10 and a light-emitting element 20 electrically connected to the pixel circuit 10. The pixel circuit 10 is configured to drive the light-emitting element 20 to emit light.

The pixel circuit 10 includes at least a drive module, that is, a drive transistor DT, a data write module 103, a bias adjustment module 102, and a light emission control module 101. The drive module, that is, the drive transistor DT, is configured to generate a drive current. The data write module 103 is configured to provide a data voltage signal Vdata for the drive module, that is, the drive transistor DT. The drive module, that is, the drive transistor DT, is electrically connected to the light emission control module 101.

A control terminal of the bias adjustment module 102 is connected to a bias adjustment signal SP1. A first terminal of the bias adjustment module 102 is connected to the drive module, that is, the drive transistor DT. A second terminal of the bias adjustment module 102 is connected to a bias voltage signal VD. The bias adjustment signal SP1 controls the bias voltage signal VD to write into the bias adjustment module 102.

A control terminal of the data write module 103 is connected to a data write control signal SP0. A first terminal of the data write module 103 is connected to the drive module, that is, the drive transistor DT. A second terminal of the data write module 103 is connected to the data voltage signal Vdata.

A control terminal of the light emission control module 101 is connected to a light emission control signal EM.

Figure 12:
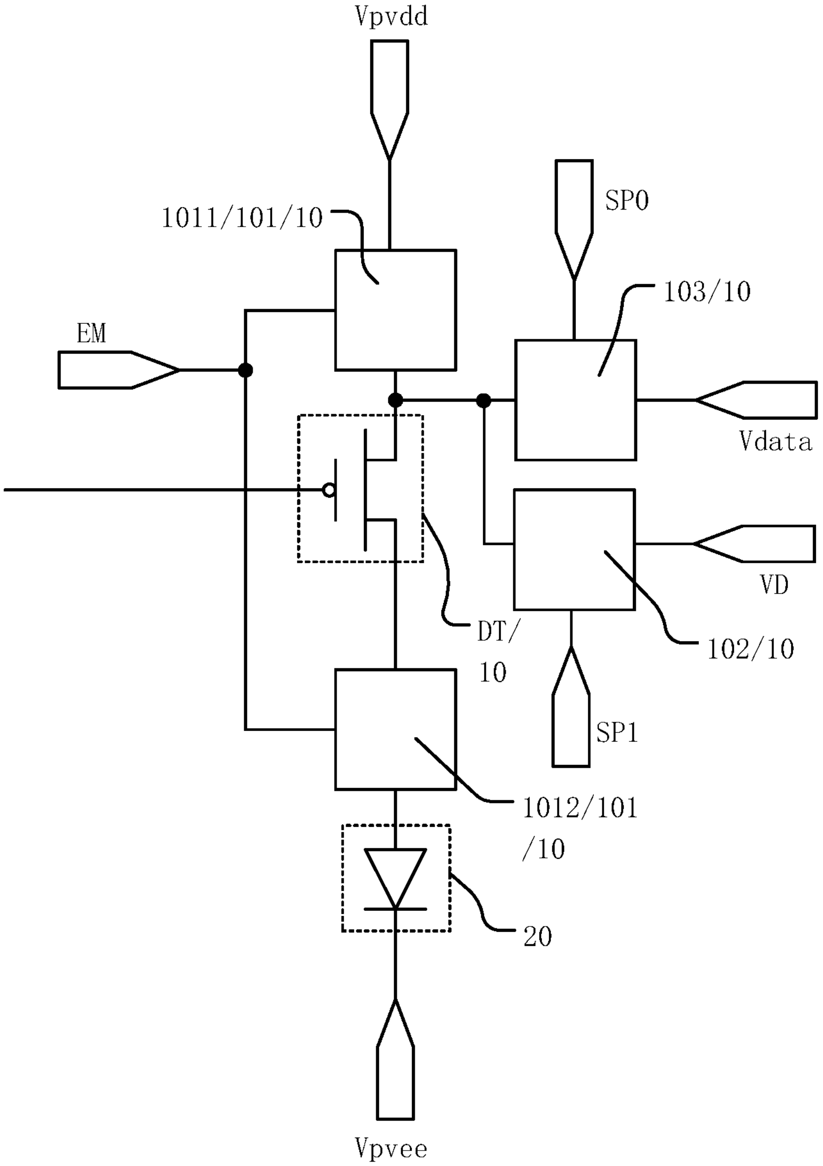
FIG. 12 is a diagram illustrating another electrical connection structure of the sub-pixel of FIG. 1.
Figure 13:
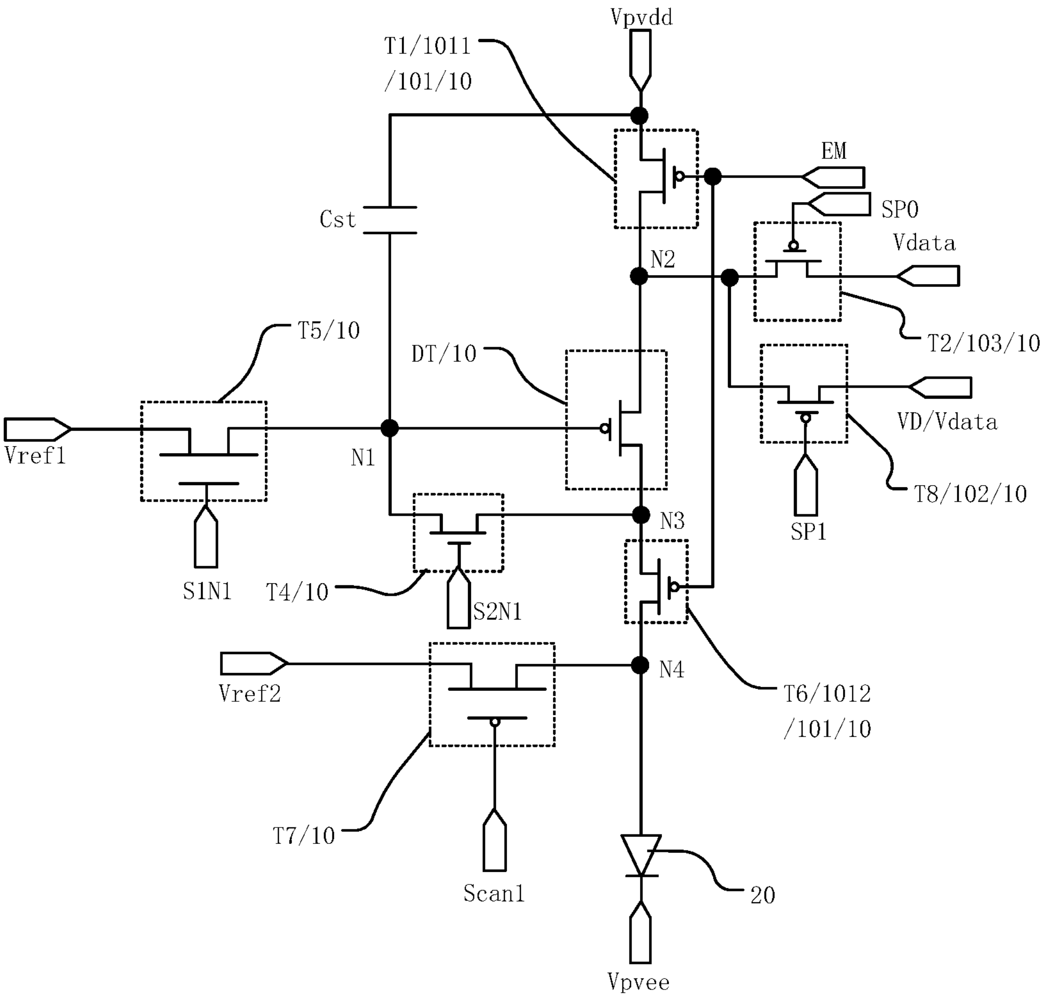
FIG. 13 is a circuit connection structure of FIG. 12.

As shown in FIG. 13, FIG. 13 is a circuit connection structure of FIG. 12. The sub-pixel P includes a pixel circuit 10 and a light-emitting element 20 electrically connected to the pixel circuit 10. The light-emitting element 20 may be an organic light-emitting diode. A first light emission control module 1011 includes a first transistor T1. A second light emission control module 1012 includes a sixth transistor T6. The data write module 103 includes a second transistor T2. The bias adjustment module 102 includes an eighth transistor T8. The pixel circuit 10 also includes a fourth transistor T4, a fifth transistor T5, a seventh transistor T7, and a storage capacitor Cst. The fifth transistor T5 and the fourth transistor T4 may be N-type oxide transistors, such as N-type IGZO transistors. Other transistors may still be P-type low-temperature polycrystalline silicon transistors.

A gate of the drive transistor DT is connected to a first pole of the fifth transistor T5. A second pole of the fifth transistor T5 is connected to a first reset signal Vref1. A gate of the fifth transistor T5 is connected to a second scan signal S1N1. A first pole of the drive transistor DT is connected to a first pole of the first transistor T1. A second pole of the first transistor T1 is connected to a first power signal Vpvdd. A gate of the first transistor T1 is connected to the light emission control signal EM. The first pole of the drive transistor DT is also connected to a first pole of the second transistor T2. A second pole of the second transistor T2 is connected to the data voltage signal Vdata. A gate of the second transistor T2 is connected to the data write control signal SP0. The first pole of the drive transistor DT is also connected to a first pole of the eighth transistor T8. A second pole of the eighth transistor T8 is connected to the bias voltage signal VD. A gate of the eighth transistor T8 is connected to the bias adjustment signal SP1.

A second pole of the drive transistor DT is connected to a first pole of the sixth transistor T6. A second pole of the sixth transistor T6 is connected to the anode of the light-emitting element 20. The cathode of the light-emitting element 20 is connected to a second power signal Vpvee. A gate of the sixth transistor T6 is also connected to the light emission control signal EM. That is, when the gate of the first transistor T1 and the gate of the sixth transistor T6 jointly respond to the light emission control signal EM, the first transistor T1 and the sixth transistor T6 are in an on state.

A first pole of the seventh transistor T7 is connected to a second reset signal Vref2. A second pole of the seventh transistor T7 is connected to the anode of the light-emitting element 20. A gate of the seventh transistor T7 is connected to a first scan signal Scan1. That is, when the gate of the seventh transistor T7 responds to the first scan signal Scan1, the seventh transistor T7 is in an on state. For example, the second reset signal Vref2 and the first reset signal Vref1 may be different reset voltage signals or may be the same reset voltage signal. In this embodiment, description is given with reference to the figure by using an example in which the second reset signal Vref2 and the first reset signal Vref1 are different reset voltage signals and provided by different signal lines.

A first pole of the fourth transistor T4 is connected to the gate of the drive transistor DT. A second pole of the fourth transistor T4 is connected to the second pole of the drive transistor DT. A gate of the fourth transistor T4 is connected to a third scan signal S2N1. That is, when the gate of the fourth transistor T4 responds to the third scan signal S2N1, the fourth transistor T4 is in an on state.

One end of the storage capacitor Cst is connected to the first power signal Vpvdd, and the other end of the storage capacitor Cst is connected to the gate of the drive transistor DT. The storage capacitor Cst is configured to stabilize the potential of the gate of the drive transistor DT, so that the drive transistor DT is kept turned on.

This embodiment illustrates another circuit connection structure that the pixel circuit 10 in the display panel 000 may include. The data write module 103 and the bias adjustment module 102 in the pixel circuit 10 may be independently configured. That is, in the data write stage, when the data write control signal SP0 controls the first terminal and the second terminal of the data write module 103 to be conductive, the data voltage signal Vdata is written into the pixel circuit 10. When the bias adjustment signal SP1 controls the first terminal and the second terminal of the bias adjustment module 102 to be conductive, the bias voltage signal VD is written into the pixel circuit 10 to perform bias voltage adjustment on the drive transistor DT. In this manner, the drive transistor DT is reverse biased. The first pole and the second pole of the drive transistor DT are inverted. Then, the degree of polarization of ions inside the drive transistor DT is weakened, and the threshold voltage of the drive transistor DT is reduced. Moreover, the impact of the hysteresis effect of the drive transistor DT on the display effect in the display panel 000 can be alleviated, thereby improving the display effect. In this embodiment, when the bias adjustment module 102 and the data write module 103 are not reused with each other, the frequency of bias adjustment also does not limit the frequency that can be reduced to. The blank stage J1 may still be configured to include the non-bias stage J11 and the bias stage J12, and the time of the bias stage J12 is an integer multiple of the bias adjustment period T-SP1. The bias adjustment signal SP1 constituting periodicity controls the bias voltage signal VD to be written at a frequency that is an integer multiple of the periodicity. Then, the bias state of the drive transistor DT is adjusted. In this manner, the display quality of the display panel is ensured, and at the same time, the frequency that can be reduced to may be diverse and flexible.

Figure 14:
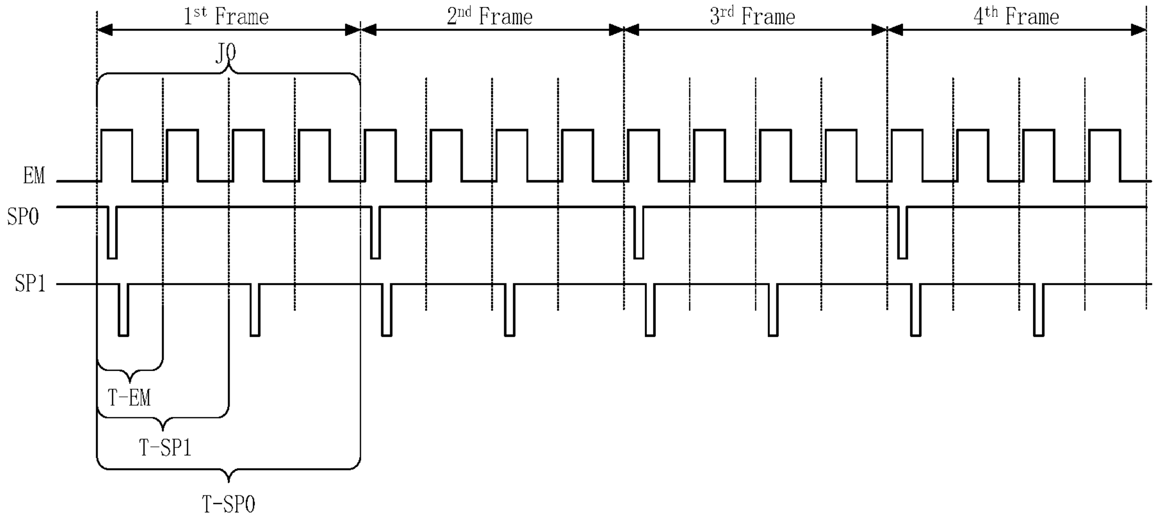
FIG. 14 is a diagram of the drive period of the pixel circuit of FIGS. 12 and 13 in multiple fundamental frequency display frames.
Figure 15:
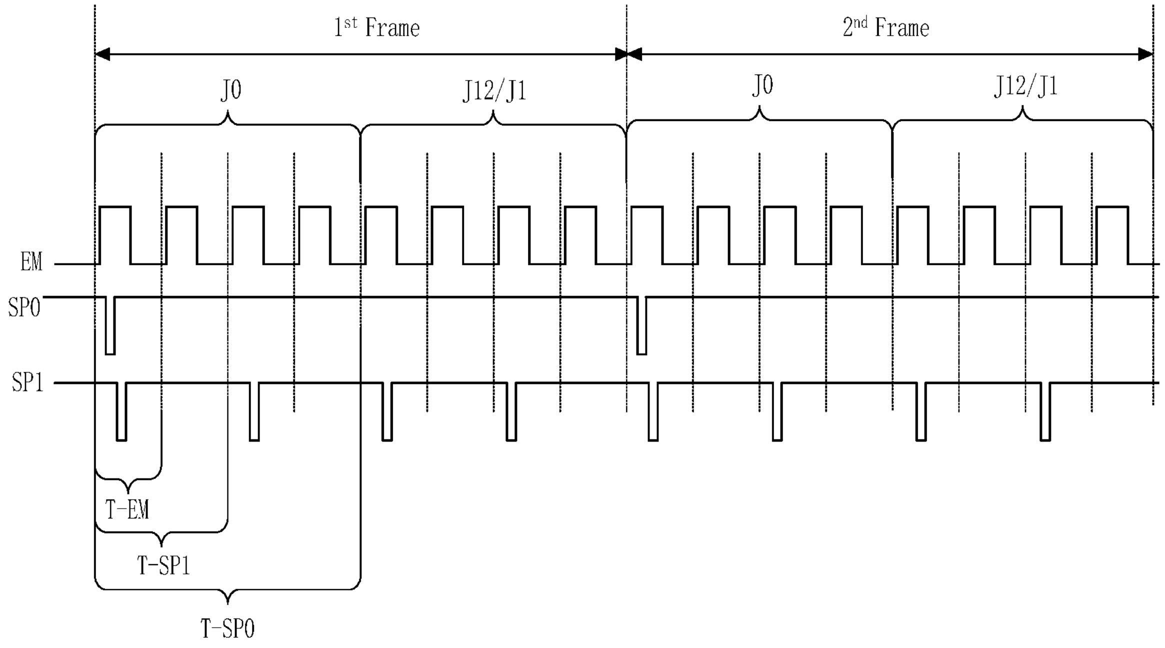
FIG. 15 is a diagram of the drive period of the pixel circuit of FIGS. 12 and 13 in multiple low frequency display frames.
Figure 16:
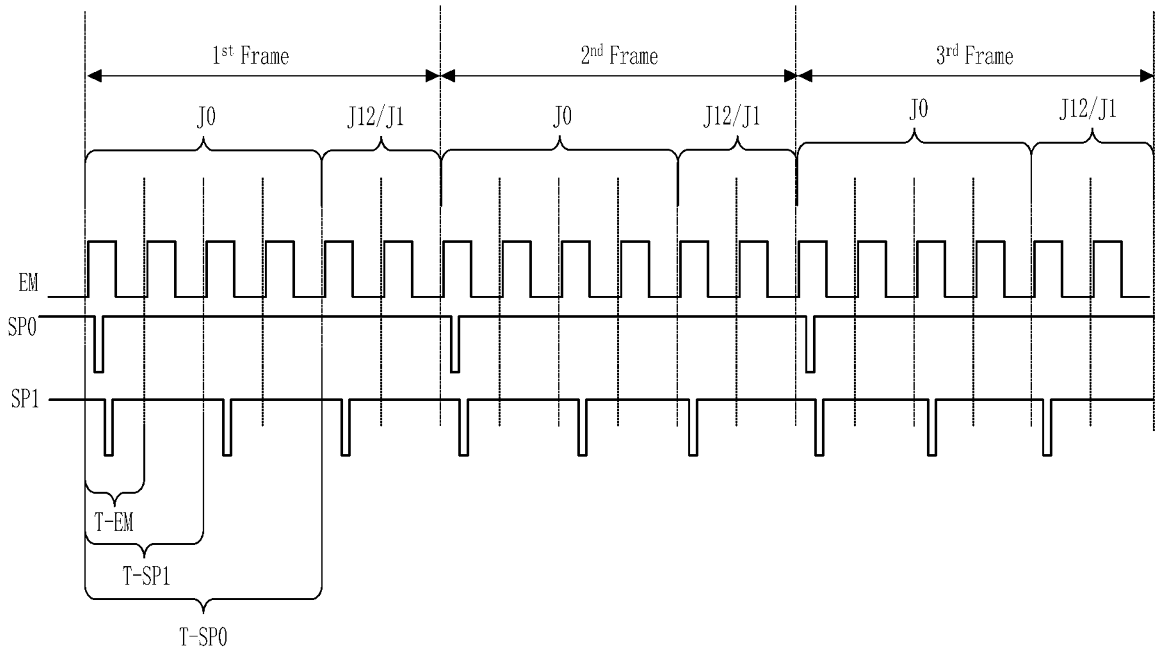
FIG. 16 is a diagram of another drive period of the pixel circuit of FIGS. 12 and 13 in multiple low frequency display frames.
Figure 17:
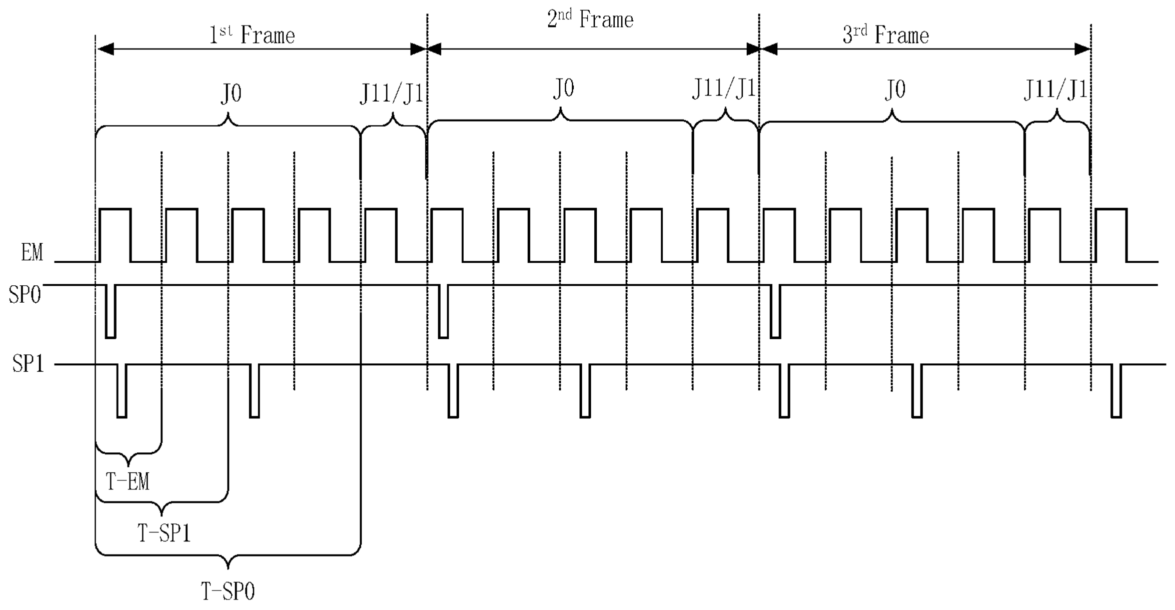
FIG. 17 is a diagram of another drive period of the pixel circuit of FIGS. 12 and 13 in multiple low frequency display frames.

As shown in FIGS. 14 to 17, FIG. 14 is a diagram of the drive period of the pixel circuit of FIGS. 12 and 13 in multiple fundamental frequency display frames; FIG. 15 is a diagram of the drive period of the pixel circuit of FIGS. 12 and 13 in multiple low frequency display frames; FIG. 16 is a diagram of another drive period of the pixel circuit of FIGS. 12 and 13 in multiple low frequency display frames; and FIG. 17 is a diagram of another drive period of the pixel circuit of FIGS. 12 and 13 in multiple low frequency display frames. In this embodiment, the bias adjustment period T-SP1 is 2 times greater than the light emission control period T-EM, that is, M is 2. A data write period T-SP0 is 4 times greater than the light emission control period T-EM (as shown in FIG. 14). It is to be understood that FIGS. 14 to 17 merely illustrate the timing of the bias adjustment signal SP1 and the data write control signal SP0 of the scan period of one row of sub-pixels. Actually, all rows of sub-pixels in the display panel 000 are driven by the bias adjustment signal SP1 and the data writing control signal SP0. Reference may be made to the bias adjustment signal SP1 of H rows of sub-pixels shown in FIG. 4 for understanding, and the details are not repeated in this embodiment.

In FIG. 15, the blank stage J1 of the low frequency display frame is configured to include the bias stage J12. That is, the low frequency display frame needs bias adjustment. In the bias stage J12 of the low frequency display frame, since the time of the inserted bias stage J12 is an integer multiple (2 times) of the bias adjustment period T-SP1, the frequency of bias adjustment does not limit the frequency that can be reduced to. Thus, if the refresh frequency of the fundamental frequency display frame in FIG. 14 is 120 Hz, the refresh frequency of the low frequency display frame after frequency reduction in FIG. 15 is 60 Hz. If the refresh frequency of the fundamental frequency display frame in FIG. 14 is 60 Hz, the refresh frequency of the low frequency display frame after frequency reduction in FIG. 15 is 30 Hz. In the blank stage J1, stepping may be adjusted through the bias adjustment signal SP1, and the bias adjustment signal SP1 may control the first terminal and the second terminal of the bias adjustment module 102 to be conductive. The bias voltage signal VD is written into the pixel circuit 10 to perform bias voltage adjustment on the drive transistor DT. In this manner, the drive transistor DT is reverse biased, and the impact of the hysteresis effect of the drive transistor DT on the display effect in the display panel 000 is alleviated, thereby improving the display effect. Moreover, the frequency that can be reduced to may be diverse and flexible. In the bias stage J12, the data write module 103 may not work. That is, the fundamental frequency scan stage J0 included in the low frequency display frame is used as a data write frame, and the data write control signal SP0 may control the data voltage signal Vdata to write into the pixel circuit 10. The bias stage J12 is used as a data maintenance frame, and the data write control signal SP0 may control the data voltage signal Vdata not to write into the pixel circuit 10.

In FIG. 16, the blank stage J1 of the low frequency display frame is configured to include the bias stage J12. That is, bias adjustment may be performed in the low frequency display frame. In the bias stage J12 of the low frequency display frame, since the time of the inserted bias stage J12 is an integer multiple (1 time) of the bias adjustment period T-SP1, the frequency of bias adjustment does not limit the frequency that can be reduced to. Thus, if the refresh frequency of the fundamental frequency display frame in FIG. 14 is 120 Hz, the refresh frequency of the low frequency display frame after frequency reduction in FIG. 16 is 80 Hz. If the refresh frequency of the fundamental frequency display frame in FIG. 14 is 60 Hz, the refresh frequency of the low frequency display frame after frequency reduction in FIG. 16 is 40 Hz. In the blank stage J1, the bias adjustment signal SP1 may control the first terminal and the second terminal of the bias adjustment module 102 to be conductive. The bias voltage signal VD is written into the pixel circuit 10 to perform bias voltage adjustment on the drive transistor DT. In this manner, the drive transistor DT is reverse biased, and the impact of the hysteresis effect of the drive transistor DT on the display effect in the display panel 000 is alleviated, thereby improving the display effect. Moreover, the frequency of frequency reduction may be diverse and flexible. In the bias stage J12, the data write module 103 may not work. That is, the fundamental frequency scan stage J0 included in the low frequency display frame is used as the data write frame, and the data write control signal SP0 may control the data voltage signal Vdata to write into the pixel circuit 10. The bias stage J12 is used as the data maintenance frame, and the data write control signal SP0 may control the data voltage signal Vdata not to write into the pixel circuit 10.

In FIG. 17, the blank stage J1 of the low frequency display frame is configured to include the non-bias stage J11. That is, bias adjustment may not be performed in the low frequency display frame. In FIG. 17, the frequency reduction method in which N is 4 and L is 1 is adopted. The time of the non-bias stage J11 is 2 times greater than the light emission control period T-EM (that is, M is 2). L is not an integer multiple of M. Thus, if the refresh frequency of the fundamental frequency display frame in FIG. 14 is 120 Hz, the refresh frequency of the low frequency display frame after frequency reduction in FIG. 17 is 96 Hz. If the refresh frequency of the fundamental frequency display frame in FIG. 14 is 60 Hz, the refresh frequency of the low frequency display frame after frequency reduction in FIG. 17 is 48 Hz. The blank stage J1 is configured, so that the frequency of frequency reduction may be diverse and flexible.

It is to be understood that in some other embodiments, the blank stage J1 illustrated in FIG. 16 and the blank stage J1 illustrated in FIG. 17 may be alternately performed (not shown in the drawings). For example, the drive period of the display panel 000 includes multiple low frequency display frames. The odd-numbered low frequency display frame may include only the bias stage J12 shown in FIG. 16. The even-numbered low frequency display frame may include only the non-bias stage J11 shown in FIG. 17. That is, in multiple low frequency display frames, the non-bias stage J11 shown in FIG. 17 and the bias stage J12 shown in FIG. 16 may be alternately performed. The first low frequency display frame may include only the bias stage J12, that is, bias adjustment is performed. The next low frequency display frame, that is, the second low frequency display frame, may include only the non-bias stage J11, that is, bias adjustment is not performed. In this manner, frequency reduction is implemented, and at the same time, it is ensured that one low frequency display frame with bias adjustment is included between two adjacent low frequency display frames without bias adjustment. Thus, brightness differences between different display frames are further reduced, thereby improving the display quality.

In some embodiments, as shown in FIGS. 1 to 7, in this embodiment, the blank stage J1 of the low frequency display frame is configured to include the non-bias stage J11, so that it is possible to perform frequency reduction on a high-frequency fundamental frequency display frame to a low-frequency low frequency display frame. When the refresh frequency of the fundamental frequency display frame is known, it is possible to obtain the refresh frequency of the low frequency display frame after frequency reduction through conversion. The steps are below.

The refresh frequency of the fundamental frequency display frame includes A Hz. The period of the fundamental frequency display frame is 1/A seconds. A is a positive integer. The time of the fundamental frequency scan stage J0 included in the low frequency display frame is 1/A seconds. The time of the fundamental frequency scan stage J0 is N times greater than the light emission control period T-EM. The time of the light emission control period T-EM is 1/NA seconds. The time of the non-bias stage J11 included in the low frequency display frame is L times greater than the light emission control period T-EM. L is not an integer multiple of M. The time of the non-bias stage J11 included in the low frequency display frame is L/NA seconds. It can be seen that the period of the low frequency display frame is the sum of the time of the fundamental frequency scan stage J0 and the time of the non-bias stage J11 of the blank stage J1, that is, 1/A seconds+L/NA seconds. The period of the low frequency display frame is calculated to be $$\frac{N+L}{NA}$$

seconds. The refresh frequency of the low frequency display frame is $$\frac{NA}{N+L}\text{Hz}.$$

Figure 18:
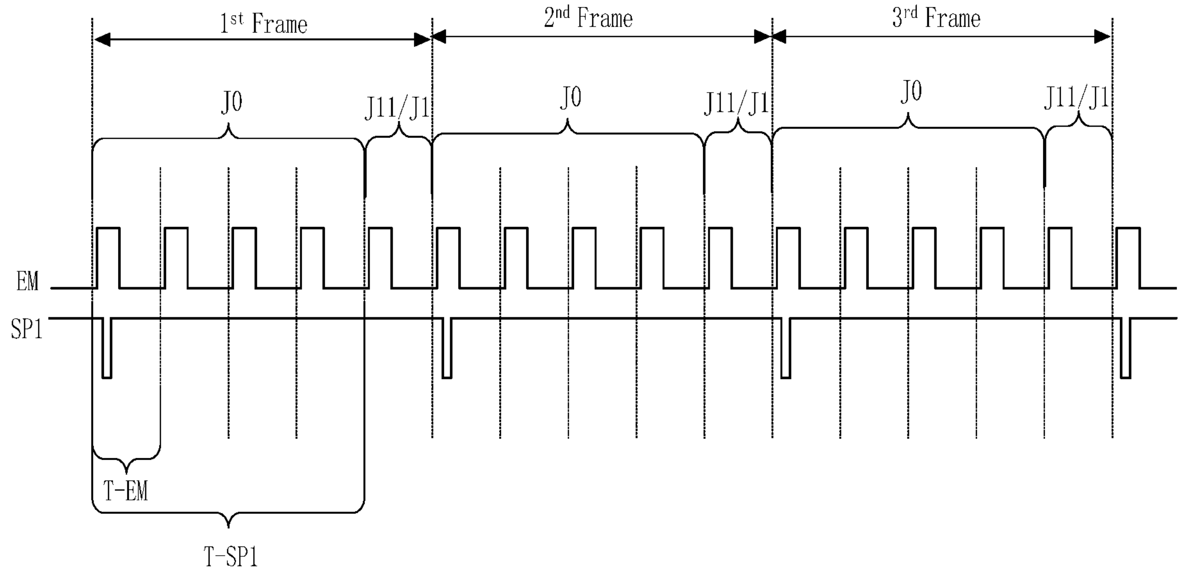
FIG. 18 is another diagram of the drive period of the display panel in multiple low frequency display frames in the driving method according to an embodiment of the present disclosure.

In some embodiments, if the refresh frequency of the fundamental frequency display frame is 120 Hz, the period of the fundamental frequency display frame is $\frac{1}{120}$ seconds. As shown in FIG. 18, FIG. 18 is another diagram of the drive period of the display panel in multiple low frequency display frames in the driving method according to an embodiment of the present disclosure. In this embodiment, for example, 4 light emission control periods T-EM are included in the period of the fundamental frequency display frame, and the light emission control period T-EM is one fourth multiplied by $\frac{1}{120}$ seconds, that is, $\frac{1}{480}$ seconds. The time of the fundamental frequency scan stage J0 is 4 times greater than the light emission control period T-EM, that is, N is 4. The time of the fundamental frequency scan stage J0 included in the low frequency display frame is 4 times greater than $\frac{1}{480}$ seconds, that is, $\frac{1}{120}$ seconds.

The time of the non-bias stage J11 included in the low frequency display frame is the light emission control period T-EM multiplied by 1, that is, L is 1. The time of the non-bias stage J11 included in the low frequency display frame is $\frac{1}{480}$ seconds. It can be seen that the period of the low frequency display frame is the sum of the time ($\frac{1}{120}$ seconds) of the fundamental frequency scan stage J0 and the time ($\frac{1}{480}$ seconds) of the non-bias stage J11 of the blank stage J1, that is, $\frac{1}{120}$ seconds+$\frac{1}{480}$ seconds, that is, $\frac{1}{96}$ seconds. The refresh frequency of the low frequency display frame is 96 Hz.

In this embodiment, the blank stage J1 of the low frequency display frame is configured to include the non-bias stage J11, so that the refresh frequency of the display panel 000 can be reduced from 120 Hz of the fundamental frequency display frame to 96 Hz of the low frequency display frame. Then, the quotient of the refresh frequency (120 Hz) of the fundamental frequency display frame and the refresh frequency (96 Hz) of the low frequency display frame is not a positive integer other than 1. That is, the refresh frequency of the fundamental frequency display frame is not an integer multiple of the refresh frequency of the low frequency display frame. Thus, the display panel 000 has more switchable frequency options for frequency reduction, and various switching requirements of different high and low frequencies can be satisfied.

Figure 19:
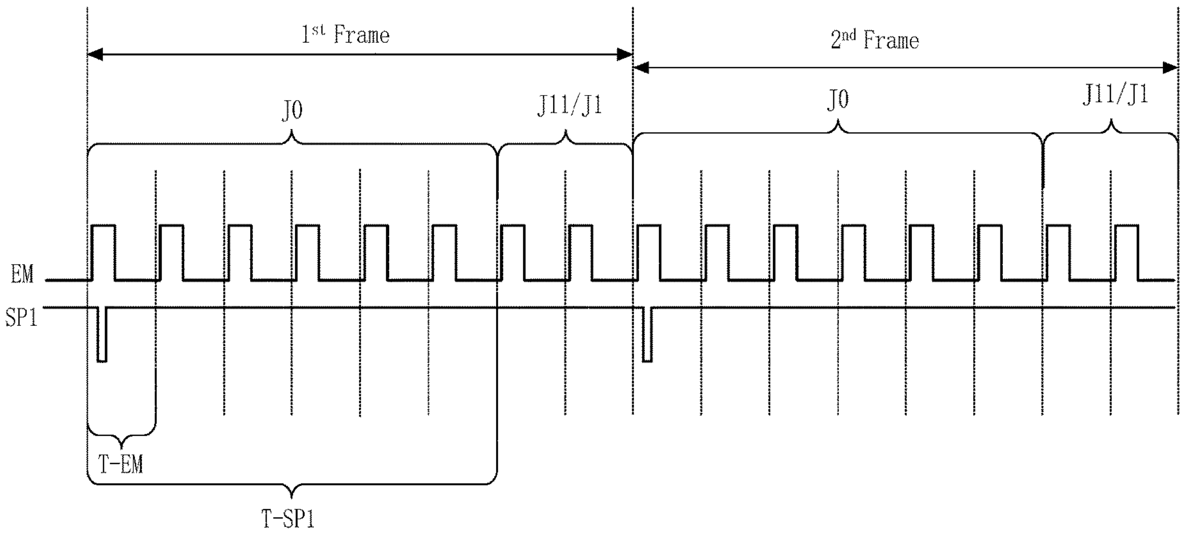
FIG. 19 is another diagram of the drive period of the display panel in multiple low frequency display frames in the driving method according to an embodiment of the present disclosure.

In some embodiments, if the refresh frequency of the fundamental frequency display frame is 120 Hz, the period of the fundamental frequency display frame is $\frac{1}{120}$ seconds. As shown in FIG. 19, FIG. 19 is another diagram of the drive period of the display panel in multiple low frequency display frames in the driving method according to an embodiment of the present disclosure. In this embodiment, for example, 6 light emission control periods T-EM are included in the period of the fundamental frequency display frame, and the light emission control period T-EM is one sixth multiplied by $\frac{1}{120}$ seconds, that is, $\frac{1}{720}$ seconds. The time of the fundamental frequency scan stage J0 is 6 times greater than the light emission control period T-EM, that is, N is 6. The time of the fundamental frequency scan stage J0 included in the low frequency display frame is 6 times greater than $\frac{1}{720}$ seconds, that is, $\frac{1}{120}$ seconds.

The time of the non-bias stage J11 included in the low frequency display frame is 2 times greater than the light emission control period T-EM, that is, L is 2. The time of the non-bias stage J11 included in the low frequency display frame is $\frac{2}{720}$ seconds. It can be seen that the period of the low frequency display frame is the sum of the time ($\frac{1}{120}$ seconds) of the fundamental frequency scan stage J0 and the time ($\frac{2}{720}$ seconds) of the non-bias stage J11 of the blank stage J1, that is, $\frac{1}{120}$ seconds+$\frac{2}{720}$ seconds, that is, $\frac{1}{90}$ seconds. The refresh frequency of the low frequency display frame is 90 Hz.

In this embodiment, the blank stage J1 of the low frequency display frame is configured to include the non-bias stage J11, so that the refresh frequency of the display panel 000 can be reduced from 120 Hz of the fundamental frequency display frame to 90 Hz of the low frequency display frame. Then, the quotient of the refresh frequency (120 Hz) of the fundamental frequency display frame and the refresh frequency (90 Hz) of the low frequency display frame is not a positive integer other than 1. That is, the refresh frequency of the fundamental frequency display frame is not an integer multiple of the refresh frequency of the low frequency display frame. Thus, the display panel 000 has more switchable frequency options for frequency reduction, and various switching requirements of different high and low frequencies can be satisfied.

Figure 20:
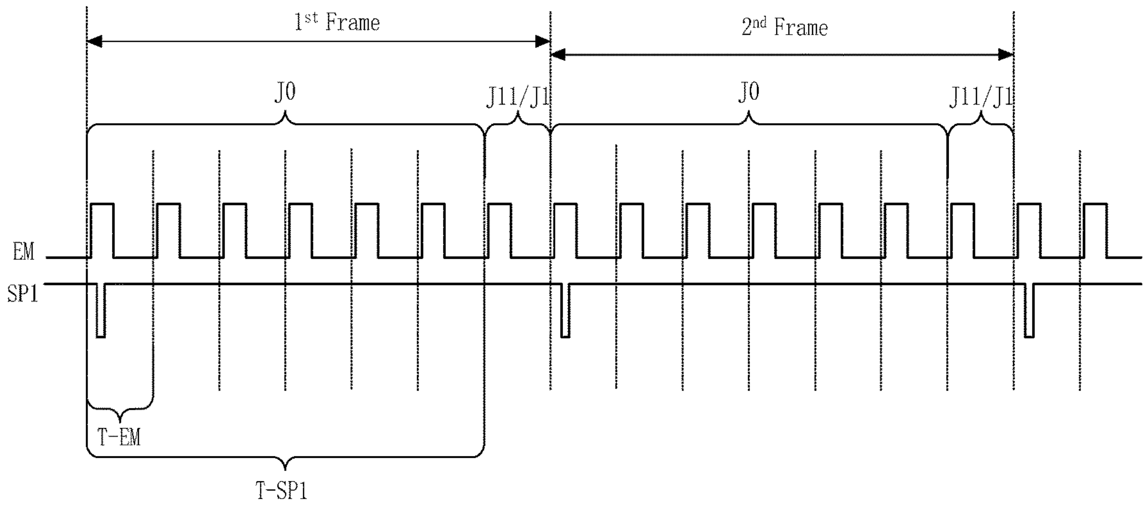
FIG. 20 is another diagram of the drive period of the display panel in multiple low frequency display frames in the driving method according to an embodiment of the present disclosure.

In some embodiments, if the refresh frequency of the fundamental frequency display frame is 120 Hz, the period of the fundamental frequency display frame is $\frac{1}{120}$ seconds. As shown in FIG. 20, FIG. 20 is another diagram of the drive period of the display panel in multiple low frequency display frames in the driving method according to an embodiment of the present disclosure. In this embodiment, for example, 6 light emission control periods T-EM are included in the period of the fundamental frequency display frame, and the light emission control period T-EM is one sixth multiplied by $\frac{1}{120}$ seconds, that is, $\frac{1}{720}$ seconds. The time of the fundamental frequency scan stage J0 is 6 times greater than the light emission control period T-EM, that is, N is 6. The time of the fundamental frequency scan stage J0 included in the low frequency display frame is 6 times greater than $\frac{1}{720}$ seconds, that is, $\frac{1}{120}$ seconds.

The time of the non-bias stage J11 included in the low frequency display frame is the light emission control period T-EM multiplied by 1, that is, L is 1. The time of the non-bias stage J11 included in the low frequency display frame is $\frac{1}{720}$ seconds. It can be seen that the period of the low frequency display frame is the sum of the time ($\frac{1}{120}$ seconds) of the fundamental frequency scan stage J0 and the time ($\frac{1}{720}$ seconds) of the non-bias stage J11 of the blank stage J1, that is, $\frac{1}{120}$ seconds+$\frac{1}{720}$ seconds, that is, 1/102.86 seconds. The refresh frequency of the low frequency display frame is 102.86 Hz.

In this embodiment, the blank stage J1 of the low frequency display frame is configured to include the non-bias stage J11, so that the refresh frequency of the display panel 000 can be reduced from 120 Hz of the fundamental frequency display frame to 102.86 Hz of the low frequency display frame. Then, the quotient of the refresh frequency (120 Hz) of the fundamental frequency display frame and the refresh frequency (102.86 Hz) of the low frequency display frame is not a positive integer other than 1. That is, the refresh frequency of the fundamental frequency display frame is not an integer multiple of the refresh frequency of the low frequency display frame. Thus, the display panel 000 has more switchable frequency options for frequency reduction, and various switching requirements of different high and low frequencies can be satisfied.

It is to be understood that FIGS. 18 to 20 merely illustrate the timing of the bias adjustment signal SP1 of the scan period of one row of sub-pixels. Actually, all rows of sub-pixels in the display panel 000 are driven by the bias adjustment signal SP1. Reference may be made to the bias adjustment signal SP1 of H rows of sub-pixels shown in FIG. 4 for understanding, and the details are not repeated in this embodiment.

In some embodiments, if the refresh frequency of the fundamental frequency display frame is 120 Hz, the period of the fundamental frequency display frame is $\frac{1}{120}$ seconds. For example, if 32 light emission control periods T-EM are included in the period of the fundamental frequency display frame, the light emission control period T-EM is one thirty-second multiplied by $\frac{1}{120}$ seconds, that is, $\frac{1}{3840}$ seconds. The time of the fundamental frequency scan stage J0 is 32 times greater than the light emission control period T-EM, that is, N is 32. The time of the fundamental frequency scan stage J0 included in the low frequency display frame is 32 times greater than $\frac{1}{3840}$ seconds, that is, $\frac{1}{120}$ seconds.

The time of the non-bias stage J11 included in the low frequency display frame is 2 times greater than the light emission control period T-EM, that is, L is 2. The time of the non-bias stage J11 included in the low frequency display frame is $\frac{2}{3840}$ seconds. It can be seen that the period of the low frequency display frame is the sum of the time ($\frac{1}{120}$ seconds) of the fundamental frequency scan stage J0 and the time ($\frac{2}{3840}$ seconds) of the non-bias stage J11 of the blank stage J1, that is, $\frac{1}{120}$ seconds+$\frac{2}{3840}$ seconds, that is, 1/112.94 seconds. The refresh frequency of the low frequency display frame is 112.94 Hz.

Alternatively, the time of the non-bias stage J11 included in the low frequency display frame is 4 times greater than the light emission control period T-EM, that is, L is 4. The time of the non-bias stage J11 included in the low frequency display frame is $\frac{4}{3840}$ seconds. It can be seen that the period of the low frequency display frame is the sum of the time ($\frac{1}{120}$ seconds) of the fundamental frequency scan stage J0 and the time ($\frac{4}{3840}$ seconds) of the non-bias stage J11 of the blank stage J1, that is, $\frac{1}{120}$ seconds+$\frac{4}{3840}$ seconds, that is, 1/106.67 seconds. The refresh frequency of the low frequency display frame is 106.67 Hz.

Alternatively, the time of the non-bias stage J11 included in the low frequency display frame is 8 times greater than the light emission control period T-EM, that is, L is 8. The time of the non-bias stage J11 included in the low frequency display frame is $\frac{8}{3840}$ seconds. It can be seen that the period of the low frequency display frame is the sum of the time ($\frac{1}{120}$ seconds) of the fundamental frequency scan stage J0 and the time ($\frac{8}{3840}$ seconds) of the non-bias stage J11 of the blank stage J1, that is, $\frac{1}{120}$ seconds+$\frac{8}{3840}$ seconds, that is, $\frac{1}{96}$ seconds. The refresh frequency of the low frequency display frame is 96 Hz.

This embodiment illustrates that the blank stage J1 of the low frequency display frame is configured to include the non-bias stage J11, so that another method in which the refresh frequency of the display panel 000 can be reduced from 120 Hz of the fundamental frequency display frame to 96 Hz of the low frequency display frame, 106.67 Hz of the low frequency display frame, or 112.94 Hz of the low frequency display frame is implemented. Then, the quotient of the refresh frequency of the fundamental frequency display frame and the refresh frequency of the low frequency display frame is not a positive integer other than 1. That is, the refresh frequency of the fundamental frequency display frame is not an integer multiple of the refresh frequency of the low frequency display frame. Thus, the display panel 000 has more switchable frequency options for frequency reduction, and various switching requirements of different high and low frequencies can be satisfied. Moreover, in this embodiment, L is set to 2, 4, 6, or 8, so that the refresh frequency of the fundamental frequency display frame is reduced to relatively high refresh frequencies of more low frequency display frames. In this manner, more relatively high refresh frequencies in the low frequency display frame are implemented. Under the relatively high refresh frequency of a low frequency display frame, frequency reduction requirements are satisfied, and at the same time, the requirement for bias adjustment is reduced.

Figure 21:
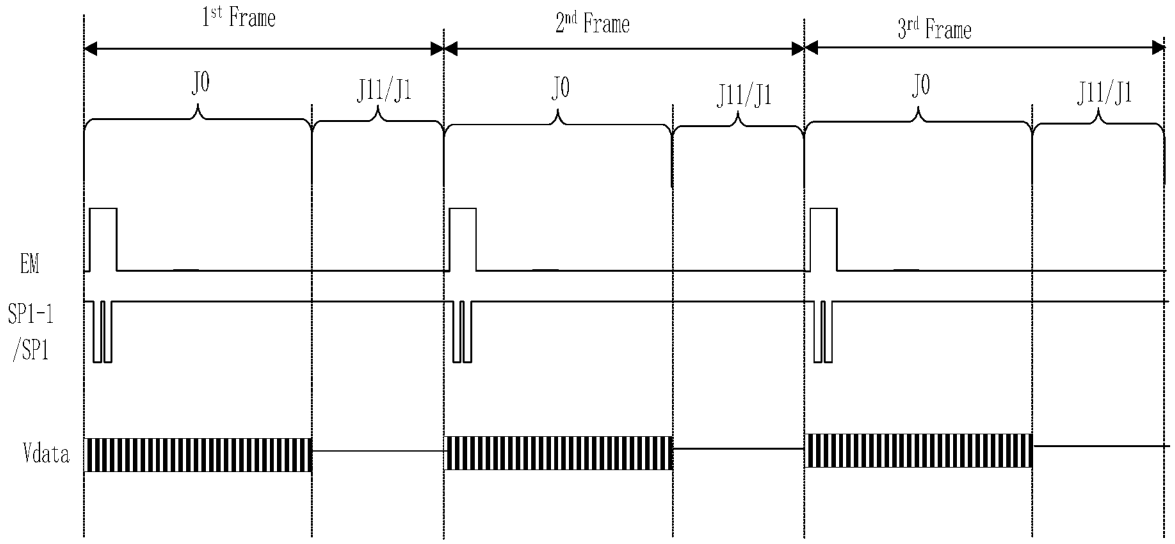
FIG. 21 is another diagram of the drive period of the display panel in multiple low frequency display frames in the driving method according to an embodiment of the present disclosure.

In some embodiments, referring to FIGS. 1, 2, and 21, FIG. 21 is another diagram of the drive period of the display panel in multiple low frequency display frames in the driving method according to an embodiment of the present disclosure. In this embodiment, the display panel 000 may adopt a direct current (DC) direct drive method to control the light-emitting element 20 of different sub-pixels P to emit light and display. An integrated driver circuit directly provides currents of different sizes to control the brightness of the light-emitting element 20. In the light emission stage, there is no need for the light emission control module 101 to continuously perform switch actions. In this manner, screen flicker can be alleviated, and the light-emitting quality is improved, thereby weakening the discomfort caused by flicker to human eyes. As shown in FIG. 21, the light emission control signal EM that controls whether or not the first terminal and the second terminal of the light emission control module 101 are conductive may always maintain an effective level (a low level as shown in FIG. 21) after the data voltage signal is written. At this time, when the display panel 000 performs frequency reduction, so that the display panel 000 enters from the fundamental frequency display frame to the low frequency display frame of a low refresh frequency, the blank stage J1 may be inserted at any time during the stage when the light emission control signal EM maintains an effective level. The blank stage J1 may include the non-bias stage J11. In the frequency reduction operation of this embodiment, since the non-bias phase J11 is inserted during the stage when the light emission control signal EM maintains an effective level, and the insertion time and insertion period of the non-bias stage J11 may not be affected by the switching of the light emission control signal EM (when an image is switched, flicker may occur since an integer multiple of the EM period is not implemented), the screen flicker caused by the insertion of the blank stage J1 may be avoided. The non-bias stage J11 may be inserted at any time when the light emission control signal EM maintains an effective level, so that any frequency of the low frequency display frame is implemented. Thus, the display panel 000 has more switchable frequency options for frequency reduction, and more switching requirements of different high and low frequencies can be satisfied. That is, the non-bias stage J11 is no longer limited to the period of the light emission control signal EM, thereby implementing more frequencies. For example, when it is necessary to implement a frequency X smaller than a fundamental frequency, the non-bias time of blank is set to J11=1/X−J0, so that a display frequency of X is implemented. Especially in an application scenario such as game rendering, since the load of rendering is different, the time taken to render each frame is different, and a delay occurs when a rendering frame rate and a display frame rate do not match. In this embodiment, the displayed frame rate X may be set according to the rendering time, thereby implementing the switching of any frequency and reducing the delay of the display.

In some embodiments, further referring to FIGS. 1 to 4, in this embodiment, the fundamental frequency display frame of the display panel 000 includes a first fundamental frequency display frame and a second fundamental frequency display frame. The refresh frequency of the first fundamental frequency display frame is different from the refresh frequency of the second fundamental frequency display frame.

In this embodiment, the fundamental frequency display frame of the display panel 000 is configured to include at least two different types of refresh frequency. For example, the fundamental frequency display frame of the display panel 000 includes at least a first fundamental frequency display frame and a second fundamental frequency display frame. The refresh frequency of the first fundamental frequency display frame is different from the refresh frequency of the second fundamental frequency display frame. Thus, in fundamental frequency display frames of different refresh frequencies, the blank stage J1 is configured, so that the display panel 000 has more switchable frequency options after frequency reduction, and more switching requirements of different high and low frequencies can be satisfied.

For example, it is assumed that the refresh frequency of the first fundamental frequency display frame is 120 Hz, and the refresh frequency of the second fundamental frequency display frame is 144 Hz.

The display panel 000 is under the refresh frequency of the first fundamental frequency display frame, that is, under 120 Hz, and the frequency reduction method in the preceding embodiments may be adopted to implement refresh frequencies of multiple low frequency display frames. As shown in the preceding embodiments, the refresh frequency of the first fundamental frequency display frame before frequency reduction is 120 Hz, and the refresh frequency of the low frequency display frame after frequency reduction may include 80 Hz, 90 Hz, 96 Hz, and 102.86 Hz. The display panel 000 is under the refresh frequency of the second fundamental frequency display frame, that is, under 144 Hz, and the frequency reduction method that is the same as the method in the embodiment of FIG. 4 is adopted (N is 4, and L is 2). The refresh frequency of the low frequency display frame after frequency reduction may be 96 Hz. The frequency reduction method that is the same as the method in the embodiment of FIG. 18 is adopted (N is 4, and L is 1), and the refresh frequency of the low frequency display frame after frequency reduction may be 115.2 Hz. The frequency reduction method that is the same as the method in the embodiment of FIG. 19 is adopted (N is 6, and L is 2), and the refresh frequency of the low frequency display frame after frequency reduction may be 108 Hz. The frequency reduction method that is the same as the method in the embodiment of FIG. 20 is adopted (N is 6, and L is 1), and the refresh frequency of the low frequency display frame after frequency reduction may be 123.4 Hz. Other frequency reduction methods may also be adopted, and the details are not repeated in this embodiment. It can be seen from the preceding examples that when the fundamental frequency display frame of the display panel 000 includes at least a first fundamental frequency display frame and a second fundamental frequency display frame having different refresh frequencies, frequency reduction is performed in fundamental frequency display frames of different refresh frequencies, so that the refresh frequency of the low frequency display frame may be more diversified. For example, the refresh frequency of the first fundamental frequency display frame is 120 Hz, and then the frequency may be reduced to at least 80 Hz, 90 Hz, 96 Hz, and 102.86 Hz. The refresh frequency of the second fundamental frequency display frame is 144 Hz, and then the frequency may be reduced to at least 96 Hz, 115.2 Hz, 108 Hz, and 123.4 Hz. Thus, the display panel 000 has more switchable frequency options after frequency reduction, and more switching requirements of different high and low frequencies can be satisfied.

In the display panel 000 of this embodiment, when the fundamental frequency display frame includes a first fundamental frequency display frame and a second fundamental frequency display frame having different refresh frequencies, frequency reduction may be performed multiple times by using stepping in which N is 6, and L is 2. For example, for the display panel 000, the refresh frequency of the first fundamental frequency display frame is 120 Hz, N may be 6, and L may be 2; and then the refresh frequency of the first low frequency display frame after frequency reduction is 90 Hz. N may be 6, and L may be 4; and then the refresh frequency of the second low frequency display frame after frequency reduction is 72 Hz. N may be 6, and L may be 6; and then the refresh frequency of the third low frequency display frame after frequency reduction is 60 Hz. For the display panel 000, the refresh frequency of the second fundamental frequency display frame is 144 Hz, N may be 6, and L may be 2; and then the refresh frequency of the first low frequency display frame after frequency reduction is 108 Hz. N may be 6, and L may be 4; and then the refresh frequency of the second low frequency display frame after frequency reduction is 86.4 Hz. N may be 6, and L may be 6; and then the refresh frequency of the third low frequency display frame after frequency reduction is 72 Hz.

It can be seen from the preceding frequency reduction process that in the first fundamental frequency display frame (for example, when the refresh frequency is 120 Hz), the refresh frequency of the low frequency display frame of the display panel 000 includes a second frequency (for example, 72 Hz). In the second fundamental frequency display frame (for example, when the refresh frequency is 144 Hz), the refresh frequency of the low frequency display frame of the display panel 000 also includes the second frequency (for example, 72 Hz). When the display panel is at the first fundamental frequency display frame, if the refresh frequency of the low frequency display frame is required to be the second frequency (for example, 72 Hz), the fundamental frequency display frame of the display panel 000 maintains as the first fundamental frequency display frame. That is, the second frequency of the low frequency display frame after frequency reduction may be implemented by frequency reduction in the first fundamental frequency display frame or by frequency reduction in the second fundamental frequency display frame, but if the display panel 000 is in the first fundamental frequency display frame at this time, the display panel 000 does not switch the fundamental frequency display frame. The previous frame is the first fundamental frequency display frame, the next fundamental frequency display frame that needs frequency reduction still maintains the first fundamental frequency display frame, and frequency reduction is performed on the next fundamental frequency display frame to the low frequency display frame of the second frequency. For example, the low frequency display frame of this frame needs to implement 72 Hz, and which 72 Hz to use is selected according to the fundamental frequency of the previous frame. If the previous frame is the first fundamental frequency display frame of 120 Hz, in the first fundamental frequency display frame, the frequency is directly reduced to 72 Hz. If the previous frame is the first fundamental frequency display frame of 144 Hz, in the first fundamental frequency display frame, the frequency is directly reduced to 72 Hz. No fundamental frequency switching is required. In this manner, the fundamental frequency switching of the display panel can be avoided, and it is beneficial to reduce the power consumption of the panel.

In this embodiment, when the fundamental frequency display frame of the display panel 000 includes a first fundamental frequency display frame and a second fundamental frequency display frame having different refresh frequencies, in the first fundamental frequency display frame, the refresh frequency of the low frequency display frame of the display panel 000 includes a third frequency. In the second fundamental frequency display frame, the refresh frequency of the low frequency display frame of the display panel 000 also includes the third frequency. The difference value between the third frequency and the refresh frequency of the first fundamental frequency display frame is less than the difference value between the third frequency and the refresh frequency of the second fundamental frequency display frame. When the display panel 000 is switched to the first fundamental frequency display frame, the refresh frequency of the low frequency display frame is set to be the third frequency. For example, the low frequency display frame after the first frequency reduction needs to implement 72 Hz, and the fundamental frequency display frame having a small difference value from the 72 Hz may be selected. For example, the refresh frequency of the first fundamental frequency display frame is 120 Hz, and the refresh frequency of the second fundamental frequency display frame is 144 Hz. The difference value between 120 Hz and 72 Hz is smaller than the difference value between 144 Hz and 72 Hz. After the display panel 000 is switched to the first fundamental frequency display frame, the frequency is reduced to the low frequency display frame of 72 Hz. In this manner, the power consumption during the frequency reduction process can be reduced, and the waste of the power consumption of the panel caused by excessive frequency reduction can be avoided.

Figure 22:
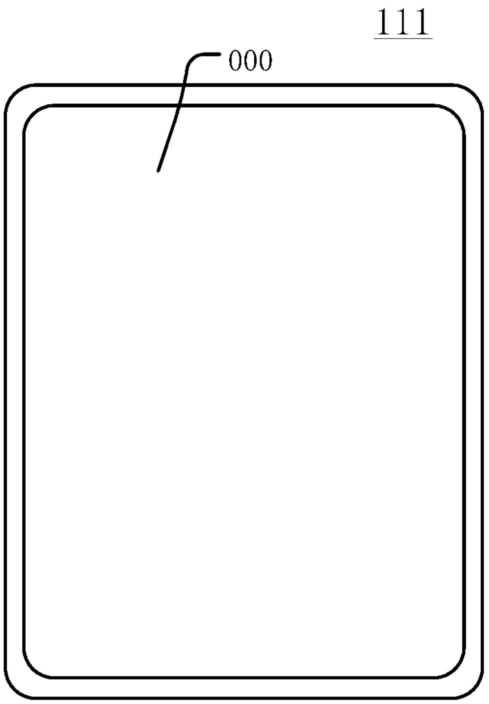
FIG. 22 is a diagram illustrating the planar structure of a display device according to an embodiment of the present disclosure.

In some embodiments, referring to FIG. 22, FIG. 22 is a diagram illustrating the planar structure of a display device according to an embodiment of the present disclosure. The display device 111 provided in this embodiment includes the display panel 000 shown in FIG. 1. The display panel 000 is driven by the driving method of the preceding embodiments. In the embodiment of FIG. 22, the display device 111 is described by using only a mobile phone as an example. It is to be understood that the display device 111 provided in this embodiment of the present disclosure may be a computer, a television, a vehicle-mounted display device, or other display devices 111 having display functions. This is not limited in the present disclosure. The display device 111 provided in this embodiment of the present disclosure has the beneficial effect of the driving method of a display panel 000 provided in the preceding embodiments of the present disclosure. For details, reference may be made to the description of the driving method of a display panel 000 in the preceding embodiments, and the details are not repeated in this embodiment.

As can be seen from the preceding embodiments, the driving method of a display panel and the display device provided by the present disclosure at least implement the beneficial effects below.

The driving method provided by the present disclosure may be applied to a display panel including an electroluminescent device such as an organic light-emitting diode display panel or a micro light-emitting diode display panel. A sub-pixel of the display panel includes a pixel circuit and a light-emitting element electrically connected to the pixel circuit. The pixel circuit is configured to transmit a light-emitting drive current to the light-emitting element under the action of the signal of a drive signal line on the display panel to provide the drive current to the light-emitting element to enable the light-emitting element to emit light. In the driving method provided by the present disclosure, the display panel to which the driving method is applied includes a fundamental frequency display frame and a low frequency display frame. The fundamental frequency display frame may be understood as a display frame under a fundamental refresh frequency before the display panel performs the frequency reduction operation. The low frequency display frame may be understood as a display frame under a low refresh frequency after the display panel performs the frequency reduction operation. The refresh frequency of the fundamental frequency display frame is greater than the refresh frequency of the low frequency display frame. In the fundamental frequency display frame, the light emission control signal includes the light emission control period. The light emission control period may be understood as the time occupied by one pulse period of the light emission control signal. The bias adjustment signal includes the bias adjustment period. The bias adjustment period may be understood as the time occupied by one pulse period of the bias adjustment signal. The bias adjustment period is M times greater than the light emission control period. The fundamental frequency display frame includes the fundamental frequency scan stage. The time of the fundamental frequency scan stage is N times greater than the light emission control period. The time of the fundamental frequency scan stage may be understood as the time of scanning from the first row of sub-pixels to the last row of sub-pixels in the driving process of the display panel. After the frequency reduction operation is performed on the display panel, the low frequency display frame may include a fundamental frequency scan stage and a blank stage. The blank stage includes at least the non-bias stage. The time of the non-bias stage is L times greater than the light emission control period. L is not an integer multiple of M. That is, under low-frequency driving after frequency reduction, bias voltage adjustment is not performed on the inserted blank stage. The bias adjustment signal is not a valid pulse signal. The bias adjustment signal controls the first terminal and the second terminal of a bias adjustment module not to be conductive. The bias voltage signal is not written. The bias adjustment module does not perform bias adjustment on the drive transistor in the pixel circuit. In this manner, the frequency of bias adjustment may be prevented from limiting the frequency that can be reduced to, thereby making the refresh frequency of the low frequency display frame more flexible. When the display panel of the present disclosure is in the low frequency display frame, the blank stage includes the non-bias stage. Bias voltage adjustment is not performed on the non-bias stage. The pulse period of the light emission control signal is inserted, that is, the EM pulse is inserted, so that low-frequency driving of the low frequency display frame is implemented. Then, the quotient of the refresh frequency of the fundamental frequency display frame and the refresh frequency of the low frequency display frame is not a positive integer other than 1. That is, the refresh frequency of the fundamental frequency display frame is not an integer multiple of the refresh frequency of the low frequency display frame. Thus, the display panel has more switchable frequency options for frequency reduction, and various switching requirements of different high and low frequencies can be satisfied.

While some embodiments of the present disclosure has been described in detail through examples, it should be understood by those skilled in the art that the preceding examples are for illustration only and are not intended to limit the scope of the present disclosure. It should be understood by those skilled in the art that modifications may be made to the preceding embodiments without departing from the scope and spirit of the present disclosure. The scope of the present disclosure is defined by the scope of the appended claims.

What is claimed is:

1. A driving method of a display panel, wherein the display panel comprises a fundamental frequency display frame and a low frequency display frame;

the display panel further comprises a light emission control signal and a bias adjustment signal; in the fundamental frequency display frame, the light emission control signal comprises a light emission control period, and the bias adjustment signal comprises a bias adjustment period; and the bias adjustment period is M times greater than the light emission control period, and M is a positive integer;

the fundamental frequency display frame comprises a fundamental frequency scan stage, time of the fundamental frequency scan stage is N times greater than the light emission control period, and N is a positive integer greater than or equal to 2; and the low frequency display frame comprises the fundamental frequency scan stage and a blank stage; and the blank stage comprises a non-bias stage, time of the non-bias stage is L times greater than the light emission control period, and L is not an integer multiple of M.

2. The driving method of a display panel according to claim 1, wherein the blank stage further comprises a bias stage, and time of the bias stage is an integer multiple of the bias adjustment period.

3. The driving method of a display panel according to claim 1, wherein a frequency of the fundamental frequency display frame is a first frequency; and in a case where a refresh frequency of the low frequency display frame is greater than or equal to half of the first frequency, the blank stage does not comprise a bias stage.

4. The driving method of a display panel according to claim 1, wherein the display panel comprises K low frequency display frames, a blank stage of each low frequency display frame from a first low frequency display frame to a (K−1)th low frequency display frame among the K low frequency display frames does not comprise a bias stage, and a blank stage of a Kth low frequency display frame among the K low frequency display frames comprises a bias stage, wherein K is a positive integer less than or equal to 10.

5. The driving method of a display panel according to claim 1, wherein a frequency of the fundamental frequency display frame is a first frequency; and in a case where a refresh frequency of the low frequency display frame is less than half of the first frequency, the blank stage comprises a bias stage or the blank stage comprises at least one non-bias stage and at least one bias stage.

6. The driving method of a display panel according to claim 1, wherein the display panel comprises a pixel circuit and a light-emitting element electrically connected to the pixel circuit, and the pixel circuit is configured to drive the light-emitting element to emit light;

the pixel circuit comprises a drive module, a data write module, and a light emission control module, the drive module is configured to generate a drive current, the data write module is configured to provide a data voltage signal for the drive module, and the drive module is electrically connected to the light emission control module;

a control terminal of the data write module is connected to a data write control signal, a first terminal of the data write module is connected to the drive module, and a second terminal of the data write module is connected to the data voltage signal; and a control terminal of the light emission control module is connected to the light emission control signal.

7. The driving method of a display panel according to claim 6, wherein the data write module is reused as a bias adjustment module; and the data write control signal is reused as the bias adjustment signal.

8. The driving method of a display panel according to claim 1, wherein the display panel comprises a pixel circuit and a light-emitting element electrically connected to the pixel circuit, and the pixel circuit is configured to drive the light-emitting element to emit light;

the pixel circuit comprises a drive module, a data write module, a bias adjustment module, and a light emission control module, the drive module is configured to generate a drive current, the data write module is configured to provide a data voltage signal for the drive module, and the drive module is electrically connected to the light emission control module;

a control terminal of the bias adjustment module is connected to the bias adjustment signal, a first terminal of the bias adjustment module is connected to the drive module, a second terminal of the bias adjustment module is connected to a bias voltage signal, and the bias adjustment signal controls the bias voltage signal to write into the bias adjustment module;

a control terminal of the data write module is connected to a data write control signal, a first terminal of the data write module is connected to the drive module, and a second terminal of the data write module is connected to the data voltage signal; and a control terminal of the light emission control module is connected to the light emission control signal.

9. The driving method of a display panel according to claim 1, wherein a refresh frequency of the fundamental frequency display frame comprises A Hz; and a period of the fundamental frequency display frame is 1/A seconds;

time of the fundamental frequency scan stage comprised in the low frequency display frame is 1/A seconds;

the time of the non-bias stage comprised in the low frequency display frame is L times greater than the light emission control period, and the time of the non-bias stage comprised in the low frequency display frame is L/NA seconds;

a period of the low frequency display frame is $$\frac{N+L}{NA}$$

seconds; and a refresh frequency of the low frequency display frame comprises $$\frac{NA}{N+L}\text{Hz.}$$

10. The driving method of a display panel according to claim 9, wherein the refresh frequency of the fundamental frequency display frame comprises 120 Hz; and the period of the fundamental frequency display frame is 1/120 seconds;

the light emission control period is 1/480 seconds, the fundamental frequency scan stage is 4 times greater than the light emission control period, and the time of the fundamental frequency scan stage comprised in the low frequency display frame is 1/120 seconds;

the time of the non-bias stage comprised in the low frequency display frame is the light emission control period multiplied by 1, and the time of the non-bias stage comprised in the low frequency display frame is 1/480 seconds;

the period of the low frequency display frame is 1/96 seconds; and the refresh frequency of the low frequency display frame comprises 96 Hz.

11. The driving method of a display panel according to claim 9, wherein the refresh frequency of the fundamental frequency display frame comprises 120 Hz; and the period of the fundamental frequency display frame is 1/120 seconds;

the light emission control period is 1/720 seconds, the fundamental frequency scan stage is 6 times greater than the light emission control period, and the time of the fundamental frequency scan stage comprised in the low frequency display frame is 1/120 seconds;

wherein the time of the non-bias stage comprised in the low frequency display frame is 2 times greater than the light emission control period, and the time of the non-bias stage comprised in the low frequency display frame is 2/720 seconds; the period of the low frequency display frame is 1/90 seconds; and the refresh frequency of the low frequency display frame comprises 90 Hz; or the time of the non-bias stage comprised in the low frequency display frame is the light emission control period multiplied by 1, and the time of the non-bias stage comprised in the low frequency display frame is 1/720 seconds; the period of the low frequency display frame is 1/102.86 seconds; and the refresh frequency of the low frequency display frame comprises 102.86 Hz.

12. The driving method of a display panel according to claim 9, wherein the refresh frequency of the fundamental frequency display frame comprises 120 Hz; and the period of the fundamental frequency display frame is 1/120 seconds;

the light emission control period is 1/3840 seconds, the fundamental frequency scan stage is 32 times greater than the light emission control period, and the time of the fundamental frequency scan stage comprised in the low frequency display frame is 1/120 seconds;

the time of the non-bias stage comprised in the low frequency display frame is 8 times greater than the light emission control period, and the time of the non-bias stage comprised in the low frequency display frame is 8/3840 seconds;

the period of the low frequency display frame is 1/96 seconds; and the refresh frequency of the low frequency display frame comprises 96 Hz.

13. The driving method of a display panel according to claim 1, wherein the fundamental frequency display frame comprises a first fundamental frequency display frame and a second fundamental frequency display frame, and a refresh frequency of the first fundamental frequency display frame is different from a refresh frequency of the second fundamental frequency display frame.

14. The driving method of a display panel according to claim 13, wherein the refresh frequency of the first fundamental frequency display frame is 120 Hz, and the refresh frequency of the second fundamental frequency display frame is 144 Hz.

15. The driving method of a display panel according to claim 14, wherein in the first fundamental frequency display frame, a refresh frequency of the low frequency display frame of the display panel comprises a second frequency;

in the second fundamental frequency display frame, the refresh frequency of the low frequency display frame of the display panel comprises the second frequency; and in a case where the display panel is at the first fundamental frequency display frame, if the refresh frequency of the low frequency display frame is required to be the second frequency, the fundamental frequency display frame of the display panel maintains as the first fundamental frequency display frame.

16. The driving method of a display panel according to claim 14, wherein in the first fundamental frequency display frame, a refresh frequency of the low frequency display frame of the display panel comprises a third frequency;

in the second fundamental frequency display frame, the refresh frequency of the low frequency display frame of the display panel comprises the third frequency; and a difference value between the third frequency and the refresh frequency of the first fundamental frequency display frame is less than a difference value between the third frequency and the refresh frequency of the second fundamental frequency display frame, and in a case where the display panel is switched to the first fundamental frequency display frame, the refresh frequency of the low frequency display frame is set to be the third frequency.

17. A display device, comprising a display panel, wherein the display panel is driven by a driving method in which the display panel comprises a fundamental frequency display frame and a low frequency display frame;

the display panel further comprises a light emission control signal and a bias adjustment signal; in the fundamental frequency display frame, the light emission control signal comprises a light emission control period, and the bias adjustment signal comprises a bias adjustment period; and the bias adjustment period is M times greater than the light emission control period, and M is a positive integer;

the fundamental frequency display frame comprises a fundamental frequency scan stage, time of the fundamental frequency scan stage is N times greater than the light emission control period, and N is a positive integer greater than or equal to 2; and the low frequency display frame comprises the fundamental frequency scan stage and a blank stage; and the blank stage comprises a non-bias stage, time of the non-bias stage is L times greater than the light emission control period, and L is not an integer multiple of M.

18. The display device according to claim 17, wherein the blank stage further comprises a bias stage, and time of the bias stage is an integer multiple of the bias adjustment period.

19. The display device according to claim 17, wherein a frequency of the fundamental frequency display frame is a first frequency; and in a case where a refresh frequency of the low frequency display frame is less than half of the first frequency, the blank stage comprises a bias stage or the blank stage comprises at least one non-bias stage and at least one bias stage.

20. The display device according to claim 17, wherein the display panel comprises a pixel circuit and a light-emitting element electrically connected to the pixel circuit, and the pixel circuit is configured to drive the light-emitting element to emit light;

the pixel circuit comprises a drive module, a data write module, and a light emission control module, the drive module is configured to generate a drive current, the data write module is configured to provide a data voltage signal for the drive module, and the drive module is electrically connected to the light emission control module;

a control terminal of the data write module is connected to a data write control signal, a first terminal of the data write module is connected to the drive module, and a second terminal of the data write module is connected to the data voltage signal; and a control terminal of the light emission control module is connected to the light emission control signal.

* * * * *